US007584225B2

(12) United States Patent
Jiang et al.

(10) Patent No.: US 7,584,225 B2
(45) Date of Patent: Sep. 1, 2009

(54) BACKUP AND RESTORE MIRROR DATABASE MEMORY ITEMS IN THE HISTORICAL RECORD BACKUP ASSOCIATED WITH THE CLIENT APPLICATION IN A MOBILE DEVICE CONNECTED TO A COMMUNION NETWORK

(75) Inventors: Zhaowei Charlie Jiang, San Jose, CA (US); Christopher Wu, Atherton, CA (US); Joy Sato, San Jose, CA (US); Yingqing Lawrence Cui, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 567 days.

(21) Appl. No.: 10/933,829

(22) Filed: Sep. 2, 2004

(65) Prior Publication Data

US 2005/0102329 A1 May 12, 2005

Related U.S. Application Data

(60) Provisional application No. 60/518,898, filed on Nov. 10, 2003, provisional application No. 60/518,858, filed on Nov. 10, 2003, provisional application No. 60/518,857, filed on Nov. 10, 2003, provisional application No. 60/518,897, filed on Nov. 10, 2003.

(51) Int. Cl.
*G06F 17/30* (2006.01)
*G06F 17/00* (2006.01)
*G06F 13/00* (2006.01)
*G06F 15/16* (2006.01)

(52) U.S. Cl. ............................ 707/204; 707/1; 707/10; 707/102; 707/200; 711/162; 709/203

(58) Field of Classification Search ................ 707/1–2, 707/10, 102, 104.1, 204–205, 200; 455/550.1, 455/418–420, 565, 567, 456.1, 557; 340/506, 340/531; 709/203, 245–246; 711/161–162
See application file for complete search history.

(56) References Cited

U.S. PATENT DOCUMENTS 5,758,088 A 5/1998 Bezaire et al.

(Continued)

FOREIGN PATENT DOCUMENTS

| EP | 1283460 | * | 2/2003 |
| EP | 1429535 | * | 6/2004 |
| WO | WO 02/27559 | * | 4/2002 |
| WO | WO 2008047189 | * | 4/2008 |

OTHER PUBLICATIONS

Sang-Kyun Kim, et al. "User-centric and remote conten t browsing for Mobile Devices", IEEE 2006, pp. 305.*

(Continued)

*Primary Examiner*—Srirama Channavajjala
(74) *Attorney, Agent, or Firm*—Darby & Darby P.C.; Jamie L. Wiegand

(57) ABSTRACT

The need for backup and restore arises in a mobile device based system when a client application is discarded along with its historical record. In a system that provides the backup and restore capability, a server is configured with a request handler, an application storage upload/download handler, and a device storage mirror database. In a mobile device (also client), the transaction listener provides a transaction associated with memory items to the crumb sticker which, in turn, sends to the request handler a recording request with the transaction along with a request URL (uniform resource locator). The data for the recording request is channeled from the client storage to the device storage mirror database via the application storage upload/download handler. The memory items are accumulated in a file at the client and in a backup at the device storage mirror database, and are restorable to the client from the backup.

29 Claims, 17 Drawing Sheets

U.S. PATENT DOCUMENTS

| | | | |
|---|---|---|---|
| 5,813,017 A | 9/1998 | Morris | |
| 5,873,100 A * | 2/1999 | Adams et al. | 707/204 |
| 6,021,433 A | 2/2000 | Payne et al. | |
| 6,167,426 A | 12/2000 | Payne et al. | |
| 6,560,618 B1 | 5/2003 | Ims | |
| 6,636,873 B1 * | 10/2003 | Carini et al. | 707/201 |
| 6,735,614 B1 | 5/2004 | Payne et al. | |
| 6,741,864 B2 * | 5/2004 | Wilcock et al. | 455/456.1 |
| 6,914,695 B2 * | 7/2005 | Walters et al. | 358/1.15 |
| 7,017,189 B1 * | 3/2006 | DeMello et al. | 726/26 |
| 7,139,885 B2 * | 11/2006 | Yamagami | 711/162 |
| 7,343,568 B2 * | 3/2008 | Jiang et al. | 715/854 |
| 7,457,829 B2 * | 11/2008 | East et al. | 707/202 |
| 2001/0037356 A1 * | 11/2001 | White et al. | 709/201 |
| 2001/0056438 A1 * | 12/2001 | Ito | 707/204 |
| 2002/0016935 A1 * | 2/2002 | Bergsten et al. | 714/20 |
| 2002/0087546 A1 * | 7/2002 | Slater et al. | 707/10 |
| 2002/0107973 A1 * | 8/2002 | Lennon et al. | 709/231 |
| 2002/0156921 A1 * | 10/2002 | Dutta et al. | 709/246 |
| 2002/0198962 A1 * | 12/2002 | Horn et al. | 709/218 |
| 2003/0023673 A1 * | 1/2003 | Tso | 709/203 |
| 2003/0038881 A1 * | 2/2003 | Chauvin et al. | 348/207.1 |
| 2003/0045331 A1 * | 3/2003 | Montebovi | 455/566 |
| 2003/0078036 A1 * | 4/2003 | Chang et al. | 455/419 |
| 2003/0115254 A1 * | 6/2003 | Suzuki | 709/202 |
| 2003/0134625 A1 * | 7/2003 | Choi | 455/418 |
| 2003/0161003 A1 * | 8/2003 | Herbert | 358/1.18 |
| 2004/0013105 A1 * | 1/2004 | Ahmavaara et al. | 370/349 |
| 2004/0092250 A1 * | 5/2004 | Valloppillil | 455/412.1 |
| 2004/0157654 A1 * | 8/2004 | Kataoka et al. | 463/4 |
| 2004/0250205 A1 * | 12/2004 | Conning | 715/517 |
| 2005/0065979 A1 * | 3/2005 | Vachovsky | 707/104.1 |
| 2005/0108303 A1 * | 5/2005 | Carter | 707/204 |
| 2006/0230081 A1 * | 10/2006 | Craswell et al. | 707/204 |

OTHER PUBLICATIONS

Sang-Kyun Kim et al. "User-Friendly personal photo browsing for mobile devices", ETRI journal, vol. 30, No. 3 Jun. 2008.*

"OFOTO" Enter a World of Digital Photography! with the following web pages: http://www.ofoto.com/Welcome.jsp; http://www.ofoto.com/UploadHome.jsp?; http://www.ofoto.com/UploadChoices.jsp?; http://www.ofoto.com/PhotoOverview.jsp?; http://www.ofoto.com/ShareOverview.jsp?; http://www.ofoto.com/OrderOverview.jsp?; http://www.ofoto.com/UploadOverview.jsp?; http://www.ofoto.com/HelpClient3.jsp?, printed Dec. 3, 2004.

* cited by examiner

"Back Button" Flow

BACKUP AND RESTORE MIRROR DATABASE MEMORY ITEMS IN THE HISTORICAL RECORD BACKUP ASSOCIATED WITH THE CLIENT APPLICATION IN A MOBILE DEVICE CONNECTED TO A COMMUNION NETWORK

REFERENCE TO PRIOR APPLICATIONS

This application claims the benefit of and incorporates by reference U.S. Provisional Application 60/518,898 entitled "BACK BUTTON IN MOBILE APPLICATION," U.S. Provisional Application 60/518,858, entitled "NAVIGATION PATTERN ON A DIRECTORY TREE," U.S. Provisional Application 60/518,857, entitled "BACKUP AND RESTORE IN MOBILE APPLICATIONS," and U.S. Provisional Application 60/518,897, entitled "UPLOAD SECURITY SCHEME," all of which were filed Nov. 10, 2003.

FIELD OF THE INVENTION

The present invention relates generally to wireless mobile devices and more particularly to applications that offer backup and restore capabilities. Among such applications, one type is a mobile photos application.

BACKGROUND

Mobile-friendly technologies are advanced to provide a rich multimedia environment and enhance the wireless device users' experience. An outcome of this evolution is the manifest closeness between the wireless universe and the Internet domain, as well as the advent of wireless devices with multimedia capabilities. The newest versions of mobile wireless devices such as digital mobile phones, pagers, personal digital assistants (PDAs), handsets, and any other wireless terminals, have multimedia capabilities including the ability to retrieve e-mail, and push and pull information via the Internet.

Because mobile devices have limited memory capacity the likelihood of them running out of memory space is quite high. Many devices can only store 2-3 J2ME™ applications before the memory is filled up (J2ME™ is Java™ 2 platform, Micro Edition, by Sun Microsystems, Inc.). As a result, users must frequently delete applications (i.e., client-side applications) from their mobile devices and re-load them at a later time.

At the same time, it is common for applications to store in the local mobile memory the history of user preferences or user actions. Thus, when such applications are deleted from the mobile devices the historical information is lost because there are no standards for preserving these preferences or action histories.

SUMMARY

The present invention is based, in part, on the observation that a need exists for better management of the memory space in mobile devices and for easier navigation in restoring historical information, and that it can be improved as described below. Specifically, the backup and restore concept is implemented in mobile applications so as to increases their usability despite the limited memory capacity of mobile devices. Because many of the preferences, actions or any other historical activity and related data ("memory items") are either extremely difficult or practically impossible to recapture, having the ability to restore, and preferably the ability to automatically restore, these "memory items" simplifies the process of restoring them when the related program is reloaded.

The broader concept of preserving and restoring these memory items applies to any mobile application. The Yahoo!' Photos application is one example in which the capability of preserving and restoring memory items includes mobile album backup and restore.

For the purpose of this invention, as embodied and broadly described herein, a method and a system are proposed as possible implementations of the backup and restore concept. These implementations typically involve a server in communication link with a plurality of mobile devices. In the context of the Yahoo! Photos application, the mobile devices are typically wireless devices such as wireless camera phones and the memory items includes photograph data (or simply one or more photos).

In one embodiment, a method for providing the backup and restore includes maintaining in a mobile device a file that accumulates a historical record of memory items associated with a client application. This method further includes sending a recording request to a backup device for each memory item accumulated in the file in order to create a backup of the historical record in the backup device, wherein the backup is accessible from the mobile device for restoring the historical record in case it is not existing in the mobile device. The method further includes for each memory item, in response to the recording request from the mobile device, saving the memory item in the backup device. Typically, the mobile device is a wireless device and the backup device is a server, both of which being capable of communicating with each other via a wireless carrier network and a network that includes the Internet.

In one implementation, the client application is a client photo application and the memory items are any recordable action, for example, any one or a combination of a mobile album, a selected photo data, a page navigation and a back in sequence navigation. The file in which the memory items are accumulated, typically in a compressed form, is an archive file such as a Java archive (JAR) file.

In this context, the selected photo data includes photo image data and any combination of a photo name, a screen size and a path into a database record in the backup device for the selected photo data. Hence, the method further includes, in response to the recording request from the mobile device, saving the selected photo data in the database record. Typically, the database record has a capacity suitable for a predetermined number of photos which if it were to be exceeded by the saving of the selected photo data includes another step. That is, the step of saving further includes discarding from the database record photo data for the oldest photo in order to make room for saving the selected photo data. Then, the historical record is restored from the backup in the server once log in to the server is done.

The restoring step comprises receiving at the mobile device a list of memory items from which any one or all of the memory items is selectable for recovery from the backup. Where the client application is a client photo application, the restoring step comprises receiving at the mobile device a mobile album list of photos from which any one or all of them is selectable for recovery from the backup. Upon selecting from the mobile album list photos for recovery from the backup, the selected photos are retrieved, unless before all of them are retrieved the mobile device reaches full memory capacity.

In one implementation, once the client application is re-downloaded and log in to the server is done, the historical record is restored from the backup in the server by automatically receiving all photos in the historical record without need for the mobile device to initiate further interactions with the server. Upon re-downloading the client application from the server to the mobile device, or downloading the client application from the server to another mobile device, the downloaded or re-downloaded client application is pre-populated with the historical record from the backup.

In another method that implements backup and restore in a system with mobile devices in communication with a server, the memory items are saved in mirror database by the server and restored by the mobile device from the historical record backup in the mirror database. Specifically, this method includes maintaining in a server a mirror database with a historical record backup for a client application uploaded from the server to a mobile device. Preferably this is done for each such application. The mirror database accumulates memory items in the historical record backup that are associated with the client application and mirror its historical record. The method further includes receiving a recording request from a mobile device for each memory item accumulated in the mirror database in order to create a respective the historical record backup in the server and saving in the mirror database the memory item associated with each respective recording request. This way, for each client application its historical record backup is accessible from the mobile device for restoring its respective historical record.

The approach described above can be implemented in a computer readable medium embodying a computer program with program code for providing the backup and restore. In this implementation, the computer program is divided into parts, one part being at a server side, a second part being at a client side and a third part being at a networking service. Alternatively, a system for providing the backup and restore includes the server, plurality of the mobile devices and typically also a wireless network, the Internet and a gateway through which the server communicates with the mobile devices. The server is configured with a processor and a memory embodying the server-side program as a portion of the computer application. The mobile devices are, in turn, configured with a processor and memory embodying the client-side program portion of the computer application.

In a particular system that provides the backup and restore capability, the server is configured with a request handler, an application storage upload/download handler, and a device storage mirror database. A mobile device, also at times referred to as a client, is configured with a client storage, a transaction listener, and a crumb sticker. The transaction listener is configured to provide a transaction to the crumb sticker which is configured, in turn, to send to the request handler the transaction along with a request URL (uniform resource locator) in a recording request. The crumb is attached to a normal client-server request. This request is typically used by a client-side application, for instance, to get a list of albums. For the purpose of the backup and restore, the crumb is piggy-backed on the tail of the URL of the normal request in order to avoid the need for additional requests specifically for backup and restore. The data for the recording request is channeled from the client storage to the device storage mirror database via the application storage upload/download handler. Each transaction sent in a recording request is associated with a memory item, the memory items being accumulated in a file in the client and in a backup historical record in the device storage mirror database, wherein the memory items are restorable to the client from the backup historical record.

As can be understood from these examples, by introducing the backup and restore capability to the system, the present invention makes better use of the limited facilities of mobile device. Such advantages will be appreciated by those of ordinary skill in the art from the description and practice of the invention disclosed herein.

BRIEF DESCRIPTION OF THE DRAWINGS

The accompanying drawings, which are incorporated in and constitute a part of this specification, illustrate embodiments of the invention and together with the description serve to explain the principles of the invention. Wherever convenient, same or similar numbers or designations are used throughout the drawings to refer to the same or like elements.

DETAILED DESCRIPTION OF THE INVENTION

Figure 1:
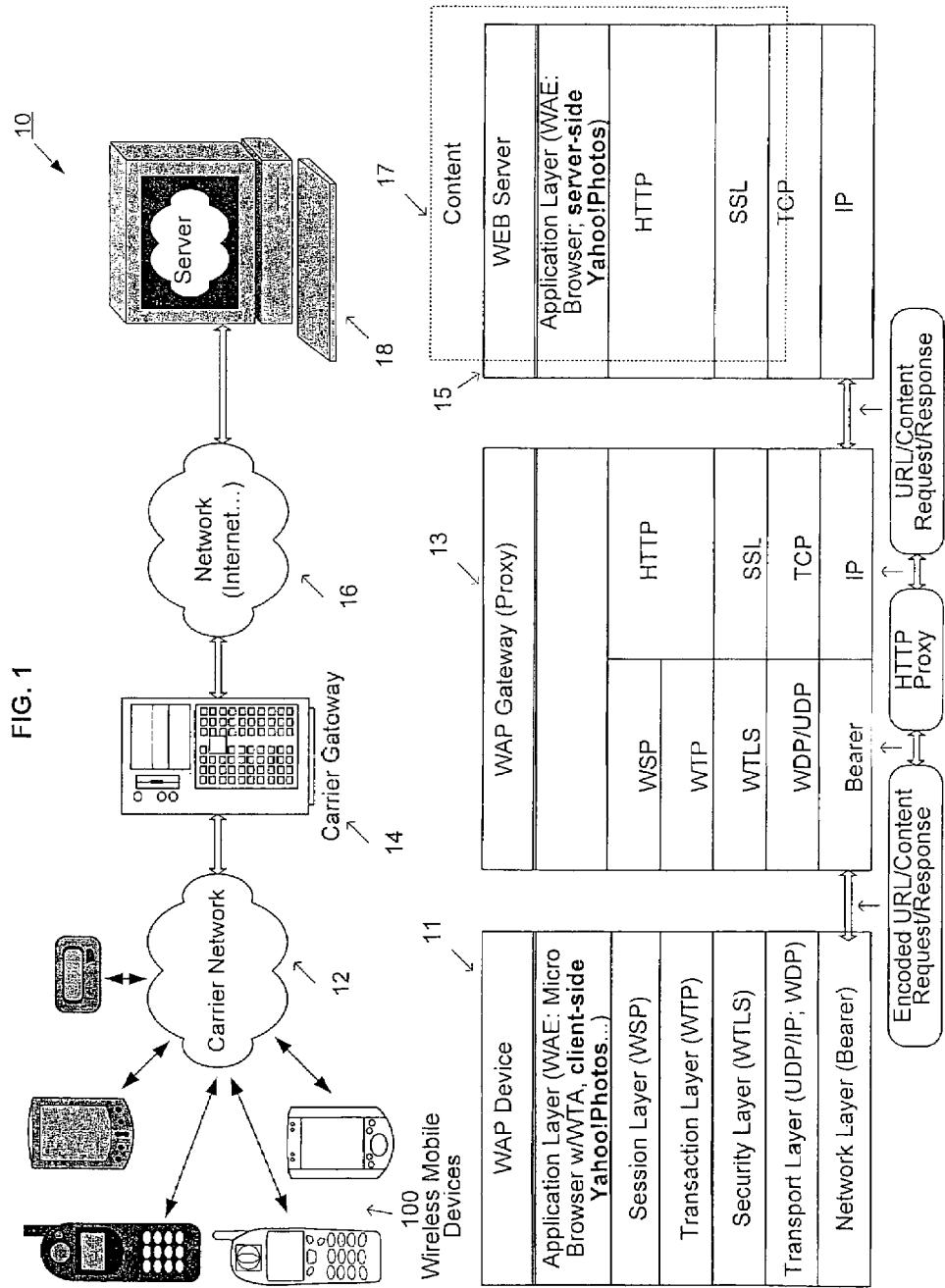
FIG. 1 shows a wireless interconnection model using one of the many types of available bearer networks.

The present invention contemplates backup and restore and the implementation of this concept in mobile applications, as illustrated in FIGS. 5E and 6A-6C and discussed in more detail in conjunction with these Figures. One such application is mobile photos, an example of which is referred to as the Yahoo! Photos™ application. Yahoo! and Yahoo! Photos are trademarks of Yahoo! Inc., Sunnyvale, Calif. Any other trademarks are the property of their respective holders.

Although it can be implemented in various applications, for clarity and for illustration, the approach contemplated by the present invention is described here in the context of the Yahoo! Photos application, as illustrated in FIGS. 1-7. The server side of this application is the "server Yahoo! Photos," and the client side of this application is the mobile client application, or "client Yahoo! Photos." A client application is generally considered to be a downloadable application; namely, J2ME™ (Java™ 2 platform, Micro Edition, by Sun Microsystems, Inc.), Yahoo! Photos™, or any other application that is downloadable to the mobile device. In the example here, the client Yahoo! Photos runs on a mobile phone, and more specifically, a mobile camera phone.

The Wireless Communication Environment

A. Wireless Communication Protocols

Wireless protocols, the standards which govern communications of data between wireless devices and the Internet, utilize and support the enhanced capabilities of modern mobile wireless devices and Internet content technologies. Hypertext transfer protocol (HTTP) is an often used standard, and other standards include the Wireless Application Protocol (WAP), M-services, i-Mode and Web clipping. Although other protocols are also possible, WAP appears to provide a proper framework for the content sharing. Therefore, adoption of standards such as WAP is suitable for the purpose of the present invention, and it is discussed in some detail below.

The adoption of WAP builds on existing Internet standards and protocols adapted for use in wireless communication networks and addresses the unique characteristics of mobile wireless devices (with limited computing, memory, display, user interface, and power capabilities). WAP is a specification suite defining a set of protocols for presentation and delivery of wireless information and telephony services on mobile wireless devices. WAP services provide information access and delivery to WAP-enabled devices. WAP was designed to empower users with easy and instant access to information and interactive services. Thus, interoperability between WAP-enabled device is possible through any WAP-compliant infrastructure to deliver timely information and accept transaction and queries.

WAP can be built on any operating system, including PalmOS, EPOC, Windows CE, FLEXOS, OS/9, JAVA OS etc. Being air interface independent, WAP is designed to be scalable to new networks as they develop, allowing bearer independence and development of common solutions across disparate networks.

The term "WAP" is commonly used to refer to the wireless application environment (WAE) although it is WAE that includes the WAP suit of protocols and technologies. WAE provides the rich application environment which enables delivery of information and interactive services to mobile wireless devices. An important aspect of the WAE is the WAP stack, namely the wireless protocol layers, as shown for example in FIG. 1. At the bottom of the WAP stack 11 is a network layer, topped by the transport layer, the security layer, the transaction layer, and the session layer.

Briefly, the network protocol layer supports network interface definitions, governing interface with the networks of wireless service providers (wireless bearers) such as short message service (SMS), code division multiple access (CDMA), cellular digital packet data (CDPD), general packet radio service (GPRS), high speed circuit-switched data (HSCSD), third generation (3G), GSM (global system for mobile communications), and unstructured supplementary service data (USSD) channel. The wireless transport layer supports the wireless datagram protocol (WDP), and when operating over an IP (Internet protocol) network layer WDP is replaced with user datagram protocol/IP (UDP/IP). WDP offers to the upper protocol layers a datagram service and transparent communication over the underlying bearer services. In other words, WDP offers to the upper protocol layers a common interface to and ability to function independent of the type of bearer wireless network. The wireless transport layer security (WTLS) provides a secure transport service to preserve the privacy, authentication and data integrity of the transport service at the layer below, as well as the ability to create and terminate secure connections between communicating applications. The transaction protocol (WTP) layer provides transaction oriented protocol for the WAP datagram service, including, for example, request-response transactions. The wireless session protocol (WSP) layer provides HTTP/1.1 functionality and features such as session suspend/resume. The WSP provides the upper-level application lever of the WAE with an interface to connection and connectionless services operating above the transaction protocol and the datagram transport layers, respectively.

The WAE (i.e., the wireless application environment) is further fashioned with a wireless markup language (WML) micro-browser, a WML script virtual machine, a WML script standard library, a wireless telephony application interface (TAI), and WAP content types. The WAP micro-browser, also referred to as the "WAP browser," facilitates interaction between WAP/Web applications and WAP-enabled devices. The micro-browser is a tag-based wireless browser application supporting wireless markup language (WML), and extensible transport hyperlink markup language (XTHML). The micro-browser uses the "card" metaphor for user interface, where user interactions are split into cards. The WAP card metaphor provides a common interface to which all applications can conform, much like the desktop metaphor in PCs. The micro-browser supports user actions, defined at tree levels (deck, card, and select & link options, i.e., ACCEPT, PREV, etc.) and default tasks (PREV, NOOP, etc.). For example, a deck of cards is split into a navigation card, variables card, and input elements card. A navigation card is formed as a script encapsulated with the 'card' tags. The following example of a card includes the type of interaction (DO TYPE="ACCEPT") and link (GO URL="#eCARD").

```
<CARD>
    <DO TYPE="ACCEPT">
    <GO URL="#eCARD"/>
    </DO
    WELCOME!
</CARD>
```

B. Wireless Communication Infrastructure

FIG. 1 shows a wireless interconnection model 10 using one of the many types of available bearer networks 12. The illustrated wireless mobile devices 100 are presumed to have sufficient local memory and Internet access capability to allow a user to download programs from servers 18 through the Internet 16 (and any other network such as LAN, WAN or Ethernet network) and store them in the local memory. Thus, wireless subscribers can gain fast access to content in these or other servers via the Internet through various downloadable applications. Note that the illustrated server 18 can be the origin of downloadable programs as well as the origin, or destination, of content; although programs and content can originate at or be destined for different servers. For the purpose of this illustration, the web server 18 is the source of the Yahoo! Photos client side application as well as the source, and destination, of content, particularly photos (image data). Using the downloaded program, such as Yahoo! Photos, and with multimedia capabilities, including the ability to retrieve e-mail, and push and pull information via the Internet, network operators (or, more generally, service providers) add value propositions beyond voice or text offerings.

Indeed, with this capability, users can capture photo images in their mobile devices, store and manipulate the captured images, and upload data of the captured images to a server (e.g., server 18). Thus, the server 18 operates as a repository for the data of photo images, and users can download from the server to their mobile devices data of previously captured photo images, as well as store and manipulate such images. Photos resident on one mobile device can be shared with another via the server 18 and the communication network(s) 12 and 16.

In this wireless interconnect model, the mobile phones used to download the Yahoo! Photos client side program are WAP-enabled. As shown in FIG. 1, the WAP-enabled devices 100 support the WAP protocol and the server 18 typically supports the WWW (world-wide web) protocol. In particular, the wireless application environment at the mobile device side 11 includes the micro-browser, a suite of WAP protocols at the network through session layers, and the downloadable (client-side) Yahoo! Photos application program. The micro-browser defines how WML documents and WML script applets should be interpreted and presented to the mobile device user. The Micro-browser's WTA (wireless telephone application) functionality provides call control, phone book access and messaging within WML script applets to allow selective call forwarding or other secure telephony. The wireless application environment at the server side 13 includes the server-side Yahoo! Photos in addition to a standard web browser and WWW protocol stack (HTTP and TCP/IP).

To enable web-based access to content, service providers deploy wireless data through the carrier network 12 while controlling the data communications to their subscribers and tracking the billable activity. Typically, the gateway 14 is tasked with tracking subscriber activities, controlling access and, in addition, functioning as the proxy for the mobile device 100, on the one hand, and for the server 18, on the other hand. The gateway 14 is implemented, building on standard web proxy technology, to interconnect the services offered by the wireless service providers to the HTTP protocol so as to permit access to content on the wired Internet.

One model of interaction between a WAP-enabled device, the WAP-enabled proxy/gateway, and the server, is the Hypertext Transfer Protocol (HTTP) 1.1 response/request transaction, where HTTP 1.1 is profiled for the wireless environment. The gateway (13 & 14) translates requests from the WAP protocol to the WWW protocol, and vice versa; translating WML(/HTML) documents to HTML(/WML), resolving domain names in URLs and providing a control point for managing access. From the WAP-enabled gateway with encoders/decoders, the URL requests or WML documents (possibly in encoded form) can be sent encoded/decoded to add security to the user interaction. Note that, unlike the flat structure of HTML documents, WML documents are divided into a set of user interaction units, namely a deck of cards. Each user interaction unit is a card (or page), and the user can navigate between cards in one or more WML documents.

Another model of interaction between a WAP-enabled device, the WAP-enabled proxy/gateway, and the server, is the HTTP response/request transaction (protocol running on top of the Internet's TCP/IP suite of protocols). This model is appropriate for the newer WAP 2.0 (with protocol stack not shown in FIG. 1). Unlike the above-mentioned, and illustrated, WAP stack 11, WAP 2.0 stack includes the IP, TCP (transmission control protocol), TLS, HTTP and WAE layers atop the network layer (all of which are profiled for wireless environment). For example, the wireless profile for the TLS protocol will permit interoperability for secure transactions.

Figure 1A:
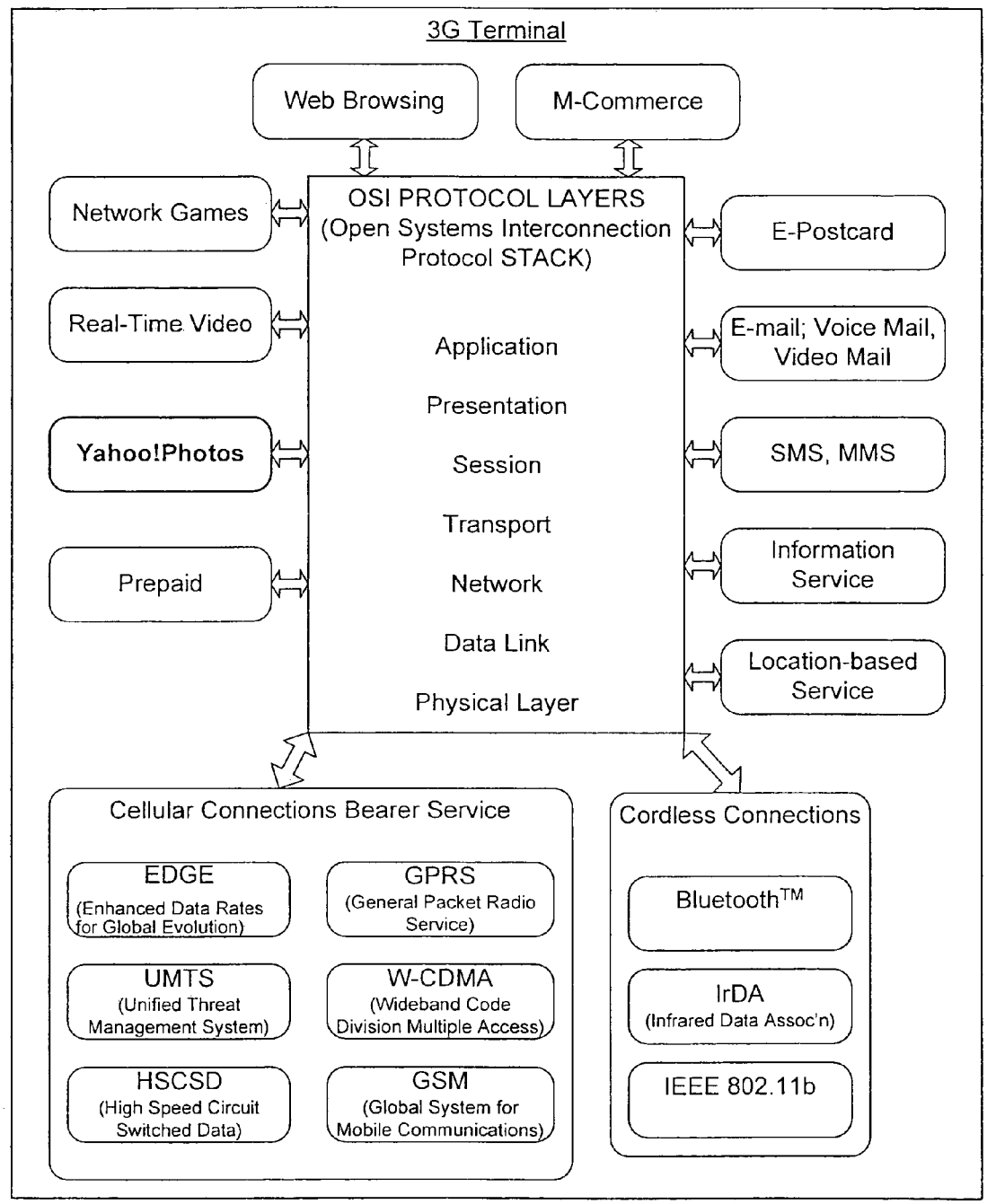
FIG. 1A shows another model of interaction, via bearer networks, between $3^{rd}$-generation (3G)-enabled mobile devices and servers as well as other devices.

Yet another model of interaction via bearer networks, between $3^{rd}$-generation (3G)-enabled mobile devices and servers or other devices, is shown in FIG. 1A. As shown, a 3G terminal supports higher-speed, wider-band wireless cellular service communications based on various technologies, including wide code division multiple access (W-CDMA), general packet radio service (GPRS), global system for mobile communications (GSM), enhanced data rates for global evolution (EDGE), unified threat management system (UMTS), and high speed circuit switched data (HSCSD). A 3G terminal is equipped with cordless connections for local, short distance communications. The communication protocols in the 3G terminal are comparable to the open system interconnection (OSI) protocols, layered in the OSI stack.

Various services are supported by these protocols, including web browsing, short message service (SMS), multimedia messaging service (MMS), e-mail, M-commerce, real-time video, and pre-paid. The MMS, for example, is a store and forward messaging service capable of adding multimedia elements to SMS, including images, text, audio clips, and video clips. MMS is synchronized across a common timeline, rather than being discrete like e-mail and SMS; it is akin to a presentation layer over e-mail and looking like a slide show with images. On a compatible phone, the MMS message will appear with a new message alert. The picture message will open on the screen, the text will appear below the image and the sound will begin to play automatically.

Downloadable applications such as Yahoo! Photos and network games are likewise supported in the 3G terminal and interact with services such as MMS. The originator can easily create a multimedia message, either using a built-in or accessory camera, or can use images and sounds stored previously in the phone (and possibly downloaded from a web site). However, for simplicity, the following description assumes that the mobile device is a WAP-enabled camera phone used for downloading photo applications such as the Yahoo! Photos.

Figure 2:
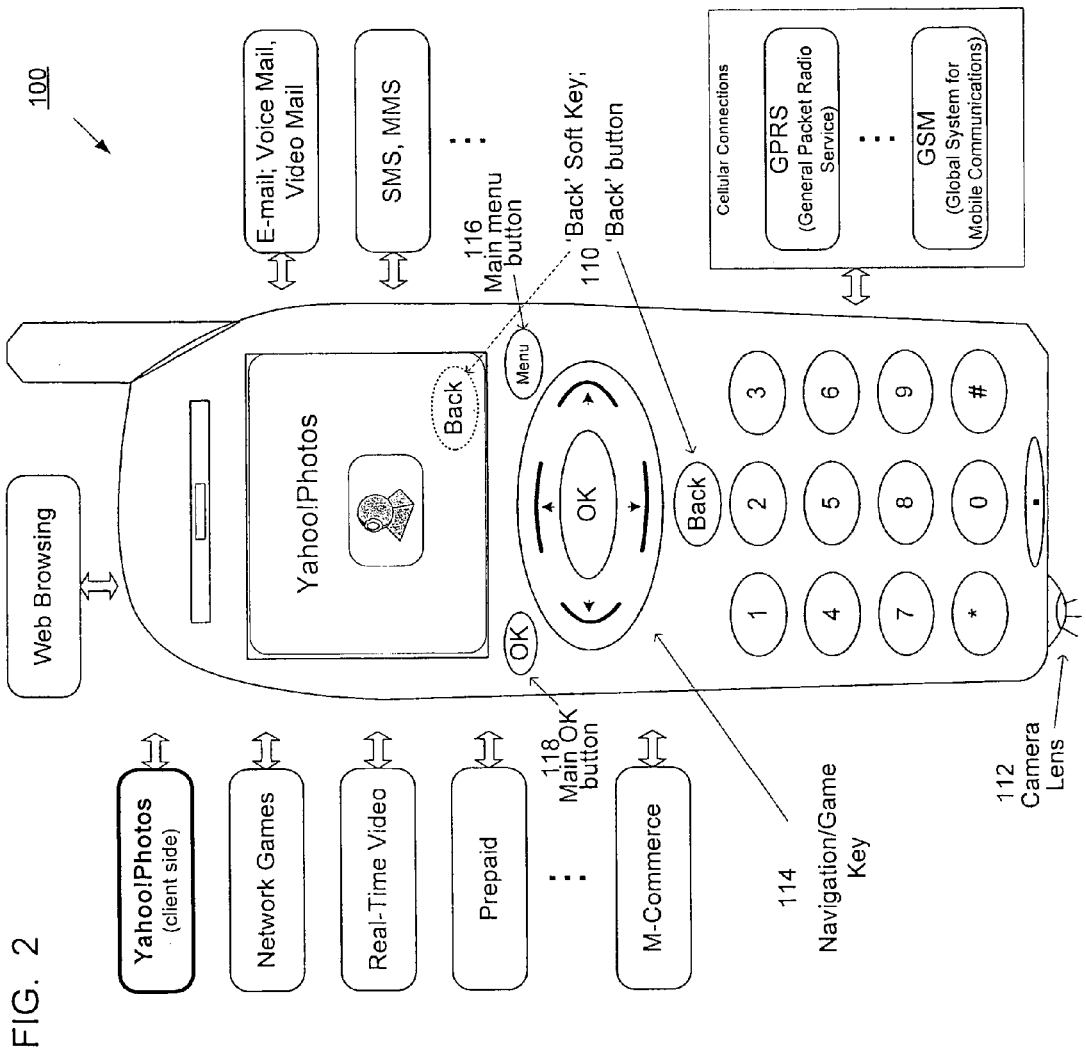
FIG. 2 shows a mobile phone with features associated with the present invention.

FIG. 2 shows a mobile phone 100, not necessarily associated with any particular manufacturer, but with features suitable for the purpose of the present invention. For example, to accommodate the Yahoo! Photos application, the mobile phone 100 has a camera feature with the camera lens 112 exposed for capturing images. The mobile phone 100 also has a 5-point navigation key (also called game key) 114, and it features left, right, up, down and selection, or 'OK,' functions, substantially mimicking the operations of a mouse. The main menu button 116 activates the menu display on the screen, and the main OK button 118 activates a menu selection. The 'back' button 110 is shown as a hardware key whose position here is merely exemplary. Namely, the physical placement of the 'back' button is device dependent, where it is anticipated that buttons on different devices may be arranged differently. A 'back' soft-key is possible to implement a 'back' function of the WAP browser, which means that it would show up as an icon or menu item on the screen of the mobile phone.

As further shown in FIG. 2, the Yahoo!-enabled phone 100 supports wireless cellular service communications based on various technologies such as the GPRS and GSM. This device is configured for supporting WAP communication protocols (at all layers of the WAP stack). Various services shown as being supported by these protocols, include web browsing, SMS, MMS, e-mail, M-commerce, real-time video, and pre-paid. The downloadable programs shown to interact with such services include the network games and Yahoo! Photos.

The mobile device functionality is preferably implemented using a platform, such as the J2ME™ platform, which is tailored for a broad range of embedded devices including mobile phones. The J2ME™ platform includes a set of standard Java APIs (application programming Interface), and provides a user interface, a security model, built-in network protocols (e.g., WAP, as shown in FIG. 1), and support for networked and disconnected applications (Yahoo! Photos is a networked application).

With the J2ME™ platform, applications are written once for a wide range of device. Applications leveraging each device's native capabilities are then downloaded dynamically. The J2ME™ platform defines configurations, profiles and optional packages as elements for building complete Java run time environments. Configurations are composed of a virtual machine and a minimal set of class libraries and provide the base functionality for a particular range of devices that share similar characteristics. Current configurations include connected limited device configuration (CLDC) for devices with limited memory and processing capabilities (e.g., mobile phones, two-way pagers, and PDAs) and connected device configuration (CDC) for devices with better memory, processing and network bandwidth capabilities (e.g., TV set-top boxes, residential gateways, in-vehicle telematics systems, and hi-end PDAs). However, in order to provide a complete runtime environment targeted at specific device categories, the configurations must be combined with a set of the high-level APIs, or profiles, that further define the application life cycle model, access to device-specific properties, and user interface.

One example of profiles is the mobile information device profile (MIDP) which is designed for mobile phones and entry-level PDAs. MIDP offers a core application functionality required by mobile applications, including user interface, network connectivity, local data storage, and application management. The J2ME™ can be further extended by combining various optional packages and their corresponding profiles to address specific market requirements, e.g., Bluetooth™, web services, wireless messaging, multimedia, and database connectivity.

Backup and Restore in the Context of Mobile Yahoo! Photos

Note that the example here focuses on the camera phone, but the principles of the present invention are not limited to camera phones. Any phone or other wireless mobile device can embody a variation of the present invention. When the mobile device is a smart handset, downloading application programs and implementing the backup and restore scheme are possible even though the communications with the service provider may be different in character.

It should be mentioned that, although the manufacturer provides the Yahoo!-enabled phone 100 with camera functionality—i.e., functionality for capturing images, and saving, displaying, manipulating, transmitting and receiving data of images—this camera functionality is independent from the Yahoo! Photos program. That is, data of the captured images reside in the mobile phone outside the Yahoo! Photos environment until such time that this data is introduced to the Yahoo! Photos environment by being first uploaded to the Yahoo! server and then downloaded to the local (mobile) Yahoo! Photos album, as will be later explained.

On mobile devices, various client application programs are offered to the user on a default start-up or main menu screen or on a manufacturer-installed virtual vending machine screen (vending machines for client (J2ME) applications are the digital rights management systems of the carriers designed to manage the ownership or licensing of applications from the carrier on behalf of the application developer/distributor to be purchased by the consumer). Other selection items include, for example, the menu item for setting the sound. These start up and vending screens show a menu with a list (or icons) of applications which the user can obtain by following an install procedure. The menu provides links to various service web sites, including, for example, the Yahoo! Photos site. The links, of course, are URLs (Uniform Resource Locator)—i.e., the world wide web address of a site on the Internet, and on the Yahoo!-enabled phone, at least one such menu item is the link for downloading the Yahoo! Photos application.

Figure 3:
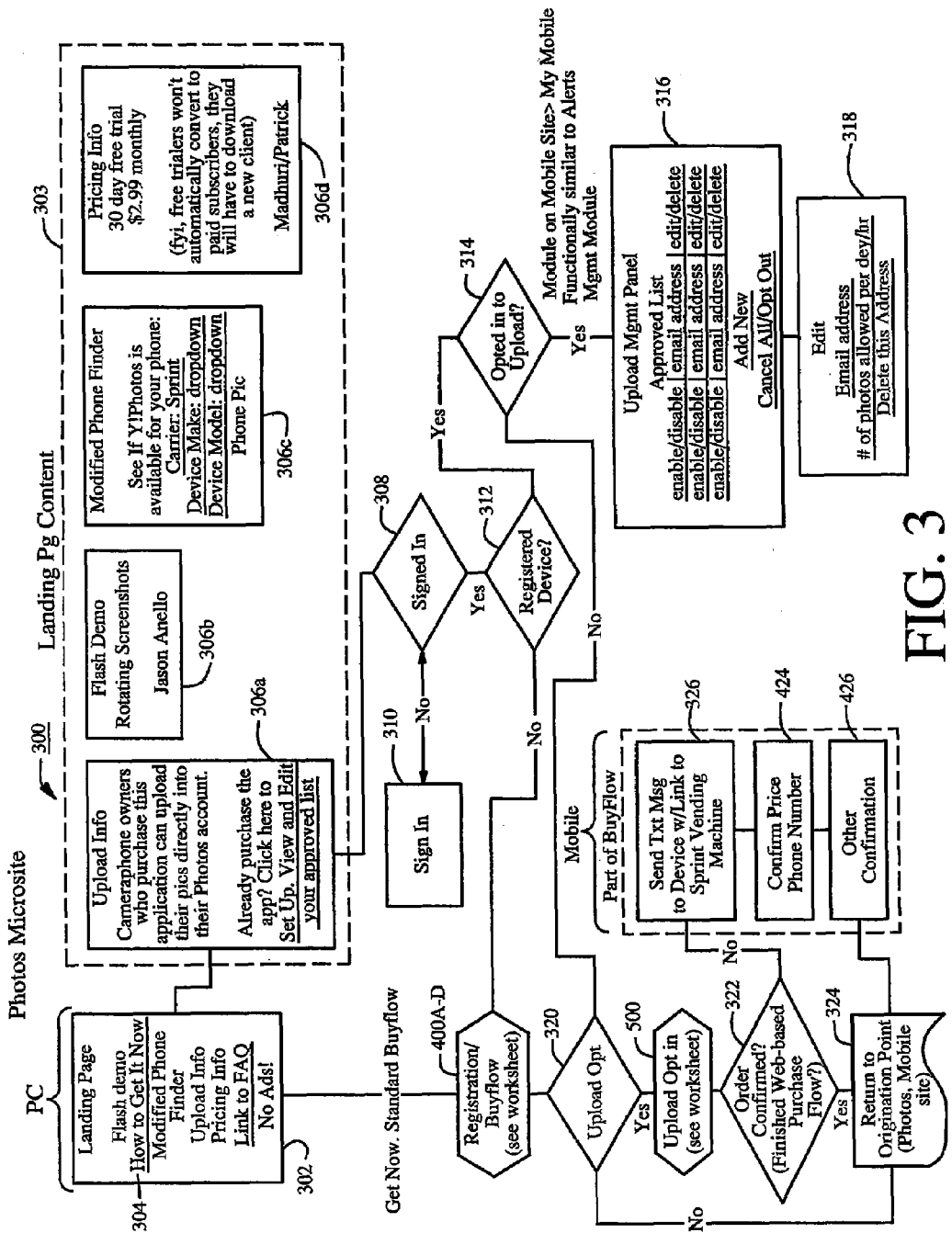
FIG. 3 illustrates the flow once users reach the Yahoo! Photos landing page.

FIG. 3 illustrates the flow once users reach the mobile application site, which, in this example, is the Yahoo! Photos landing page. The URL for the landing page is obtained via a link from a promotional web page, through a web search, or from a bookmark (or favorites). The flow is shown as originating on a user's PC (personal computer) and it commences with program information presented at the landing page 302 on the PC display. The contents 303 and 304 of the landing page is presented to show the options available to the user based on whether or not the user has already purchased the Yahoo! Photos program. For instance, the landing page presents to the user the Yahoo! Photos program name with the option of "how to get it now" 304, as well as upload information 306a, flash demo 306b, and pricing information 306d, say, "$2.99 monthly." To buy the application the user clicks on the application name, Yahoo! Photos, or on "how to get it now." Subsequent to the registration $400_{A-D}$, a query (such as "would you like to buy it for $2.99?") prompts the user to accept/reject the offer 320. Then, for the purpose of implementing upload security, the user is prompted to establish upload opt-in parameters 500, as will be later explained.

If the user accepts the offer to buy the application, the order is confirmed 322 and the application is downloaded into the mobile phone, becoming resident on the mobile phone. FIGS. 4A-4D show the respective PC-based and mobile-based registration and buy flow diagrams.

Figure 4A:
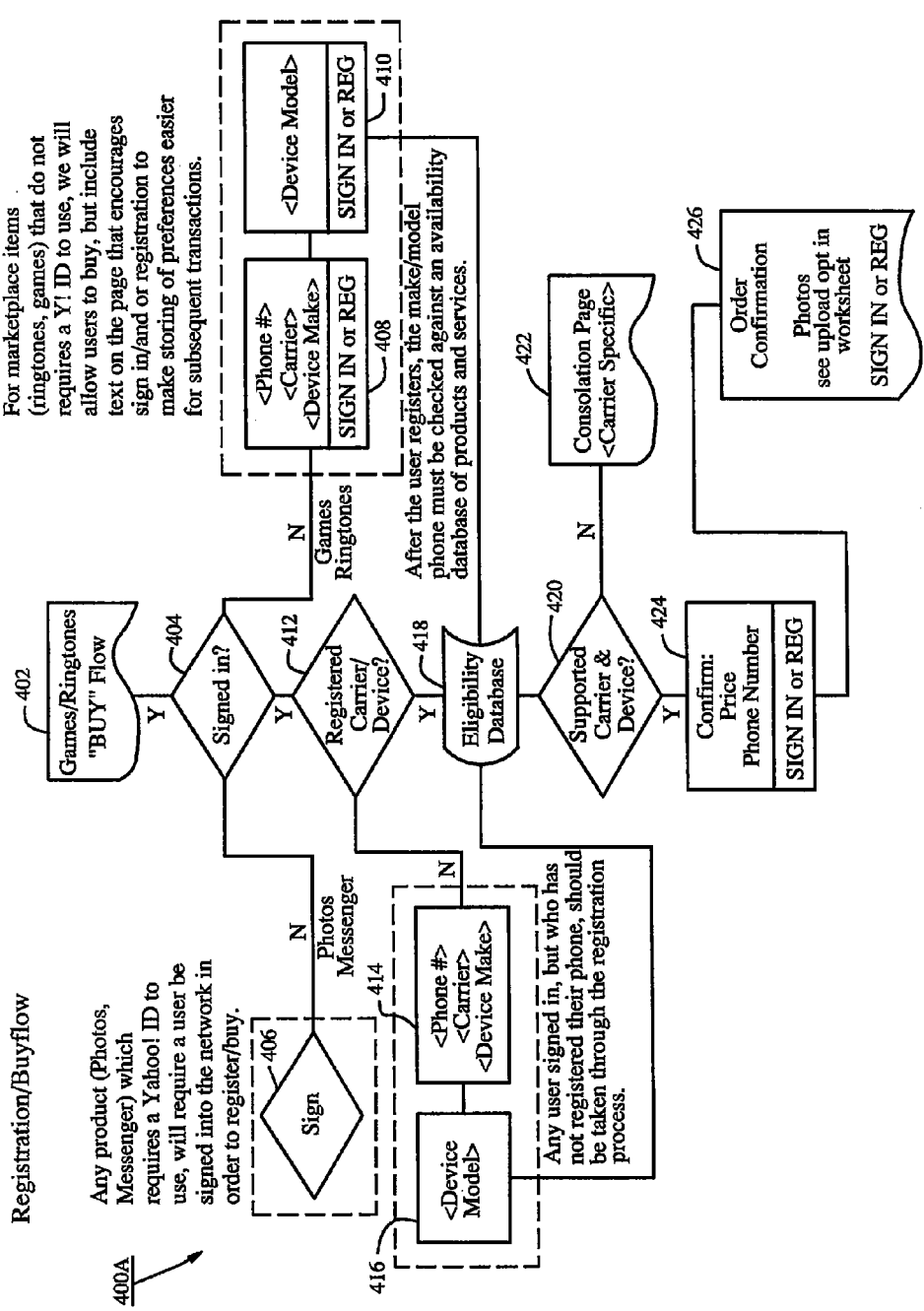
FIGS. 4A-4D show the respective PC-based and mobile device-based registration and application buy flow diagrams.

Incidentally, as shown in FIGS. 3 and 4A, if the user confirms acceptance, assuming the user has an account on the server having signed in before, the user is prompted to provide the telephone number of the mobile phone. With that phone number, the server sends a short message embedded with a link to the mobile phone and causes the mobile phone to vibrate or, otherwise, signals the user with a message requesting confirmation of the purchase 326. With this confirmation 426 the server proceeds to send the program to the mobile phone.

Figure 4B:
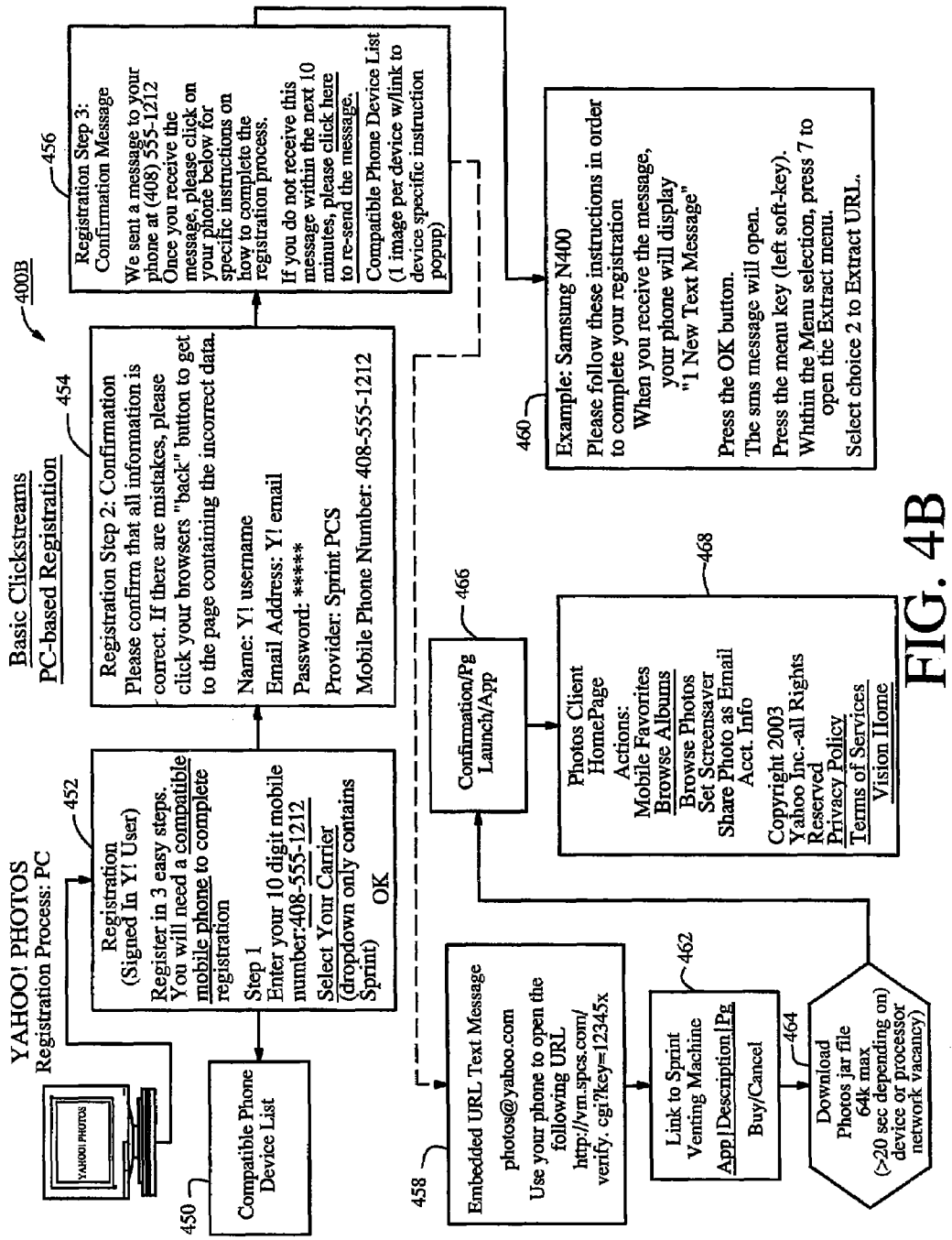
Figure 4C:
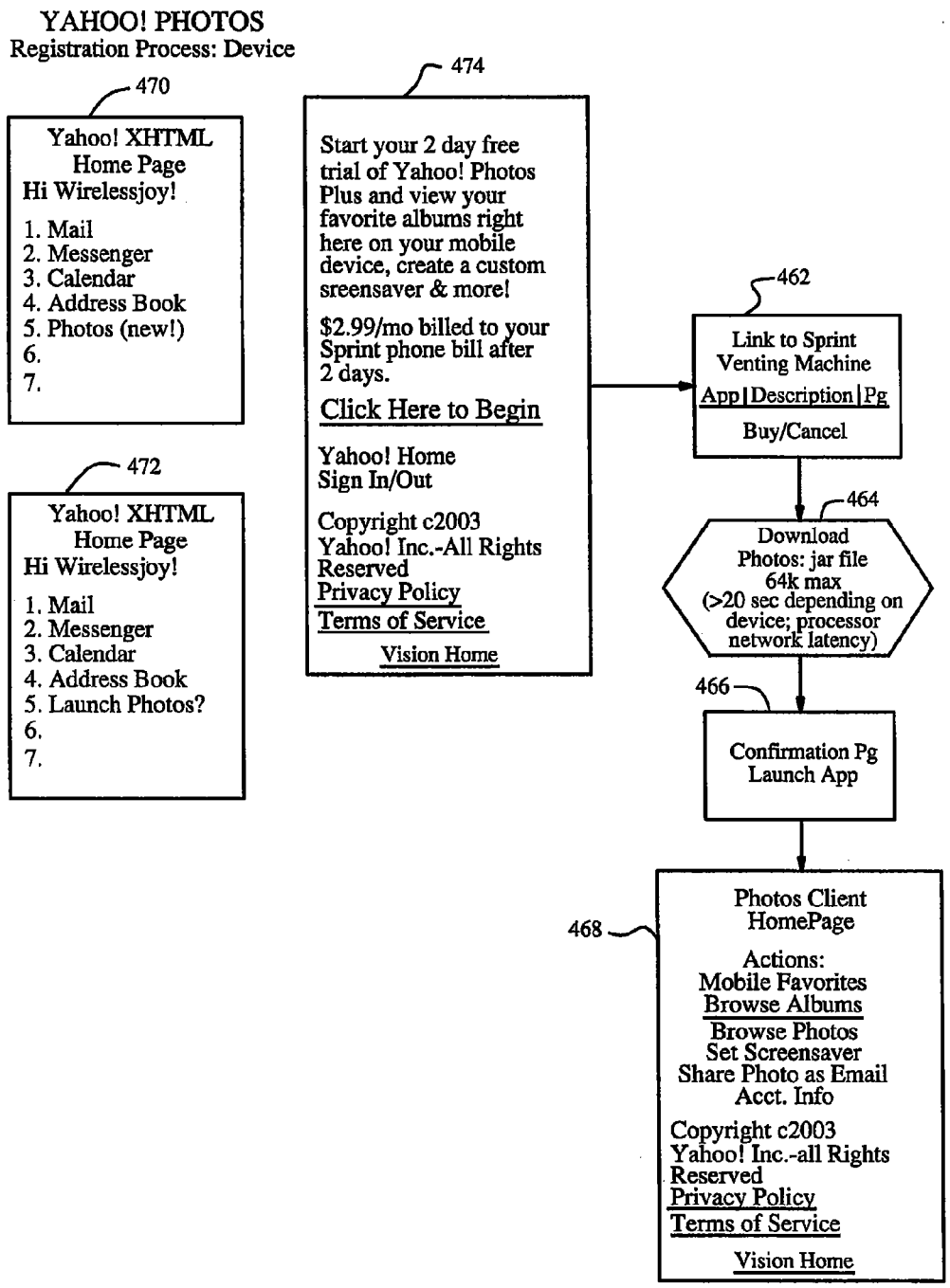

As shown in FIGS. 4B and 4C, registration can originate on the PC or the mobile phone. In the PC-based registration process, once, the compatible phone list is reviewed 450 and the phone is deemed compatible, registration can go forward starting with the user entering the 10-digit mobile phone number 452. The service provider dials the 10-digit phone number and requests confirmation from the user via that mobile phone 456. The user is also prompted to follow the buy instructions 460 or follow the link to the vending machine 458 (as mentioned, vending machines for client (J2ME) applications are the digital rights management systems of the carriers designed to manage the ownership or licensing of applications from the carrier on behalf of the application developer/distributor to be purchased by the consumer). Once the download takes place the Yahoo! Photos client home page 268 is presented on the mobile screen. Alternatively, rather than indirectly via the PC, a program such as Yahoo! Photos can be purchased directly via the mobile phone, as shown in FIG. 4C. That is, the registration process originating from the mobile phone is launched from the menu page, e.g. Yahoo! home pages 470 or 472. Beyond that, the link to (virtual) vendor machine page 462, download page 464, confirmation page 466 and home page 468 are similar to those in FIG. 4B.

Figure 4D:
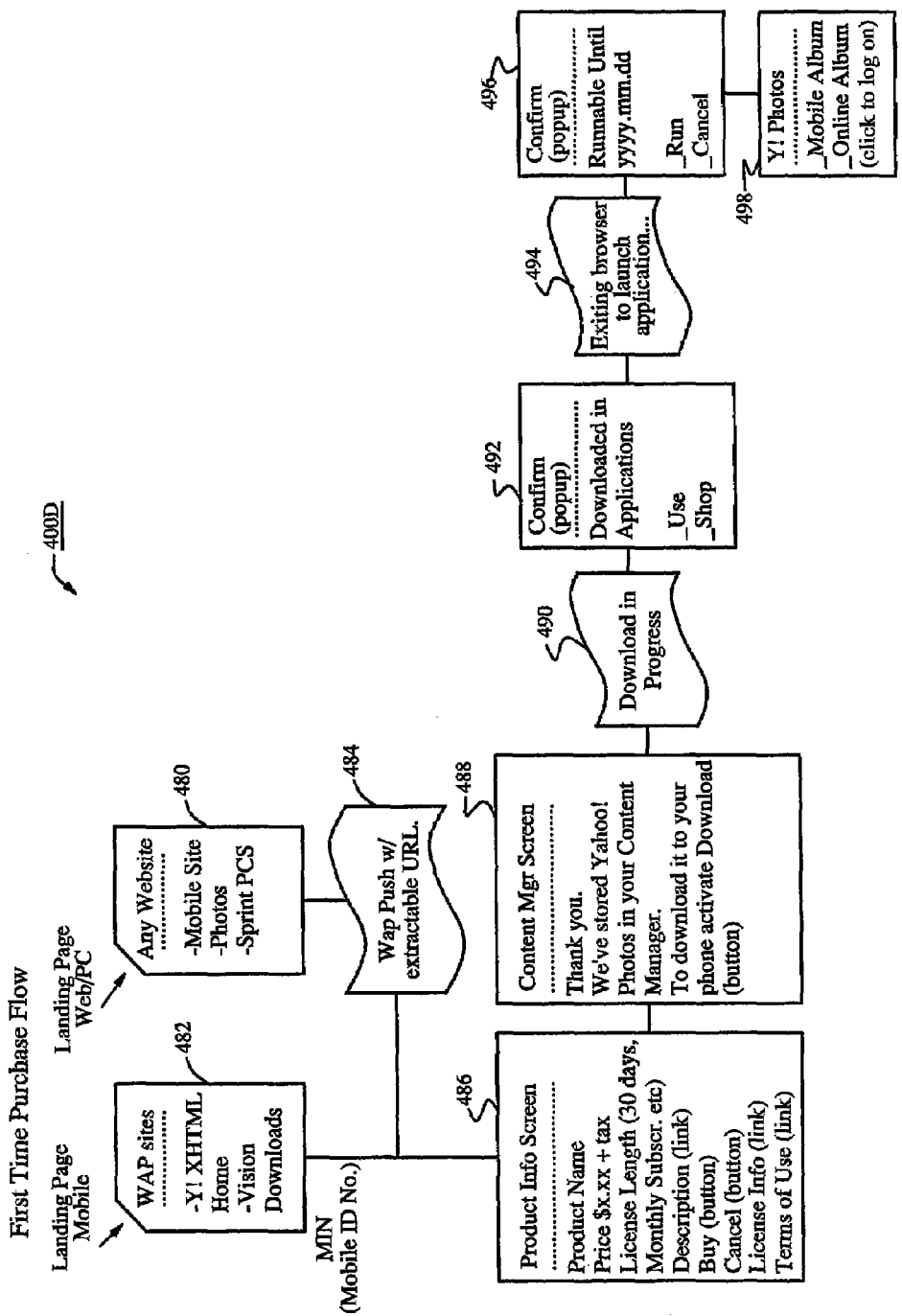

FIG. 4D shows a first-time purchase flow. As can be seen, the purchase can originate either at the PC or the mobile phone, starting with the respective landing page. Note that in the PC-based process the landing page 480 is obtained via a standard browser. In the mobile-based process, the landing page 482 presents the WAP sites, assuming the mobile phone is WAP compliant and uses the micro-browser for linking to this and subsequent pages. Then, for a first time purchaser the product information (i.e. Yahoo! Photos application) is introduced along with price and links to terms of use and buy/cancel selection buttons (icons) 486. Download activation 488, progress update 490 and confirmation 492 are provided along the way when the application is loaded. The application is then ready to launch on exiting the micro-browser 494. After being invoked, the home page of Yahoo! Photos is displayed 498.

For implementing upload security, as mentioned above, the registration and buy process of FIG. 3 includes setting the upload opt-in 500 parameters. FIG. 5 shows an upload opt-in process 500 for setting the user's upload parameters that establish the user's upload preferences (once the upload opt-in module is invoked 502). Preferably at the PC, the user is prompted to enter the service provider-issued phone numbers of mobile phones authorized by the user to upload their photos to the user's Yahoo! Photos account (on the server) 506. The user is additionally prompted to enter one or more of the user's e-mails, e.g., <user reg. #@messaging.sprintPCS> or other e-mails, e.g., <jsmith@sprintpcs.com>, through which the photos are uploaded to the user account 506. The e-mails are posted on the approved list. Although it is not shown, the user can additionally pre-select the maximum number of upload messages the user wants to receive in a day (or any other predefined period of time). At the end of this selection process the user is prompted to confirm the entries 508 before they are stored in the database for future reference.

Figure 5A:
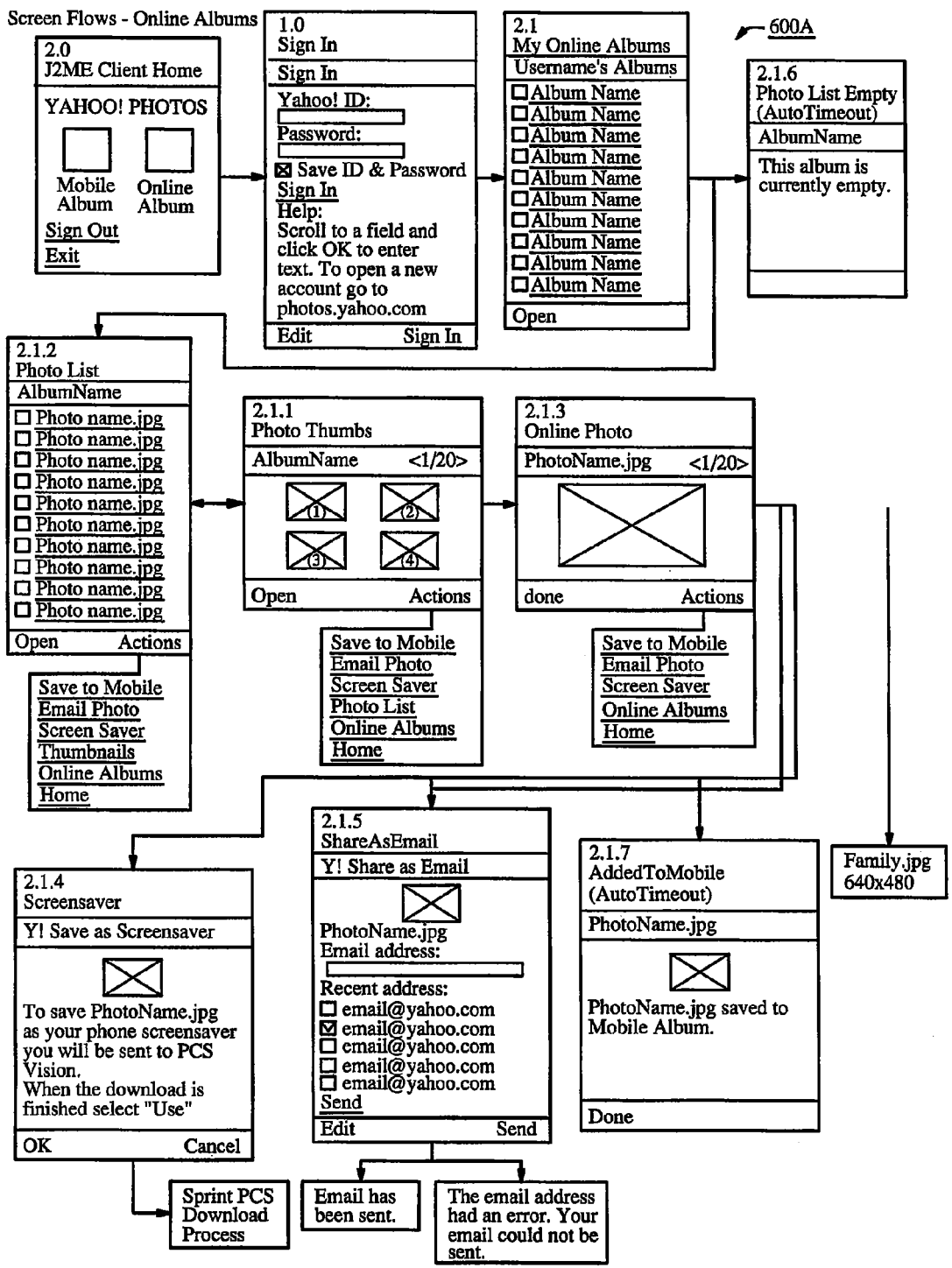
FIGS. 5A and 5B show the screen flows for online albums and mobile albums, respectively.
Figure 5B:
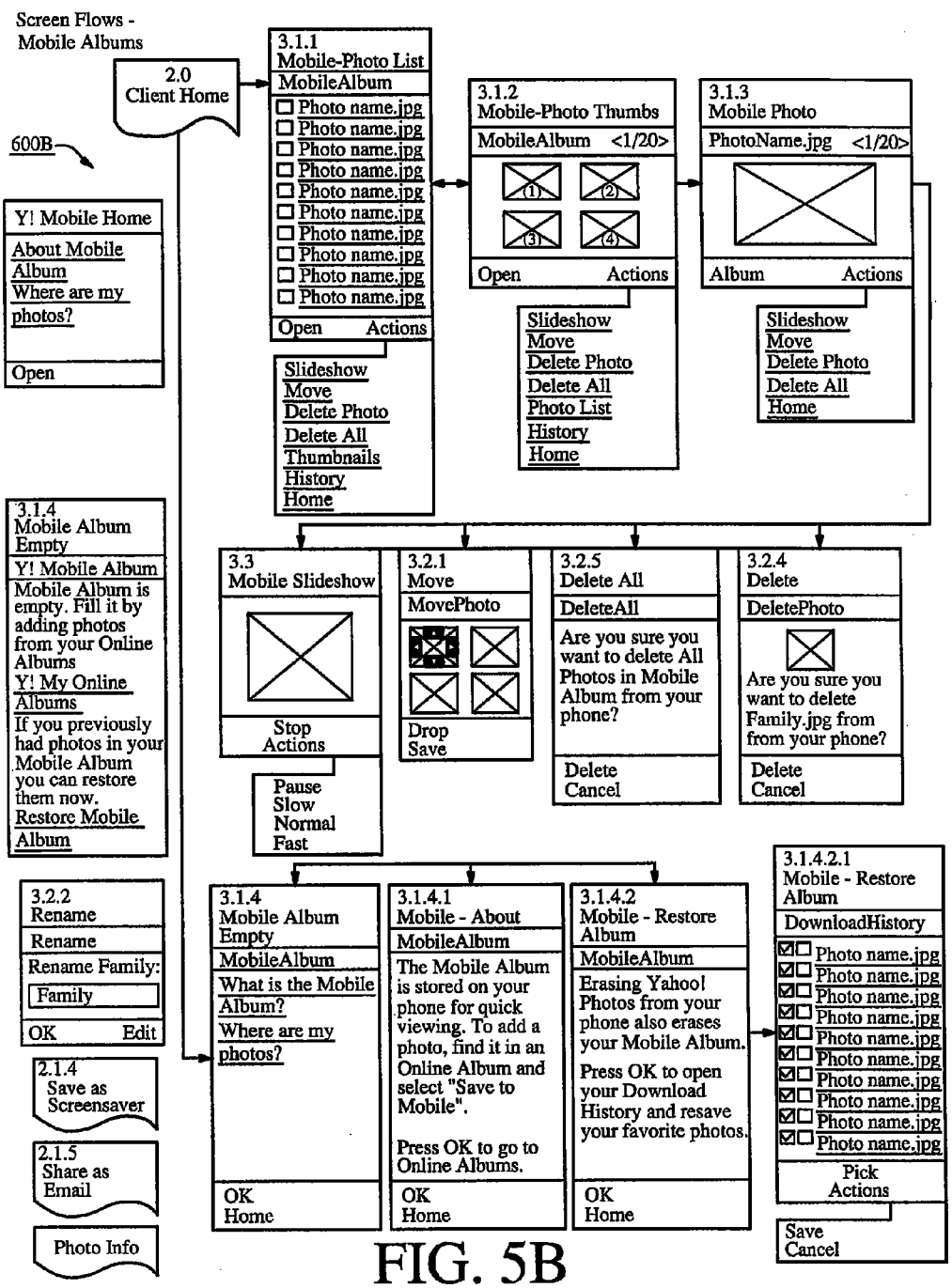
Figure 5C:
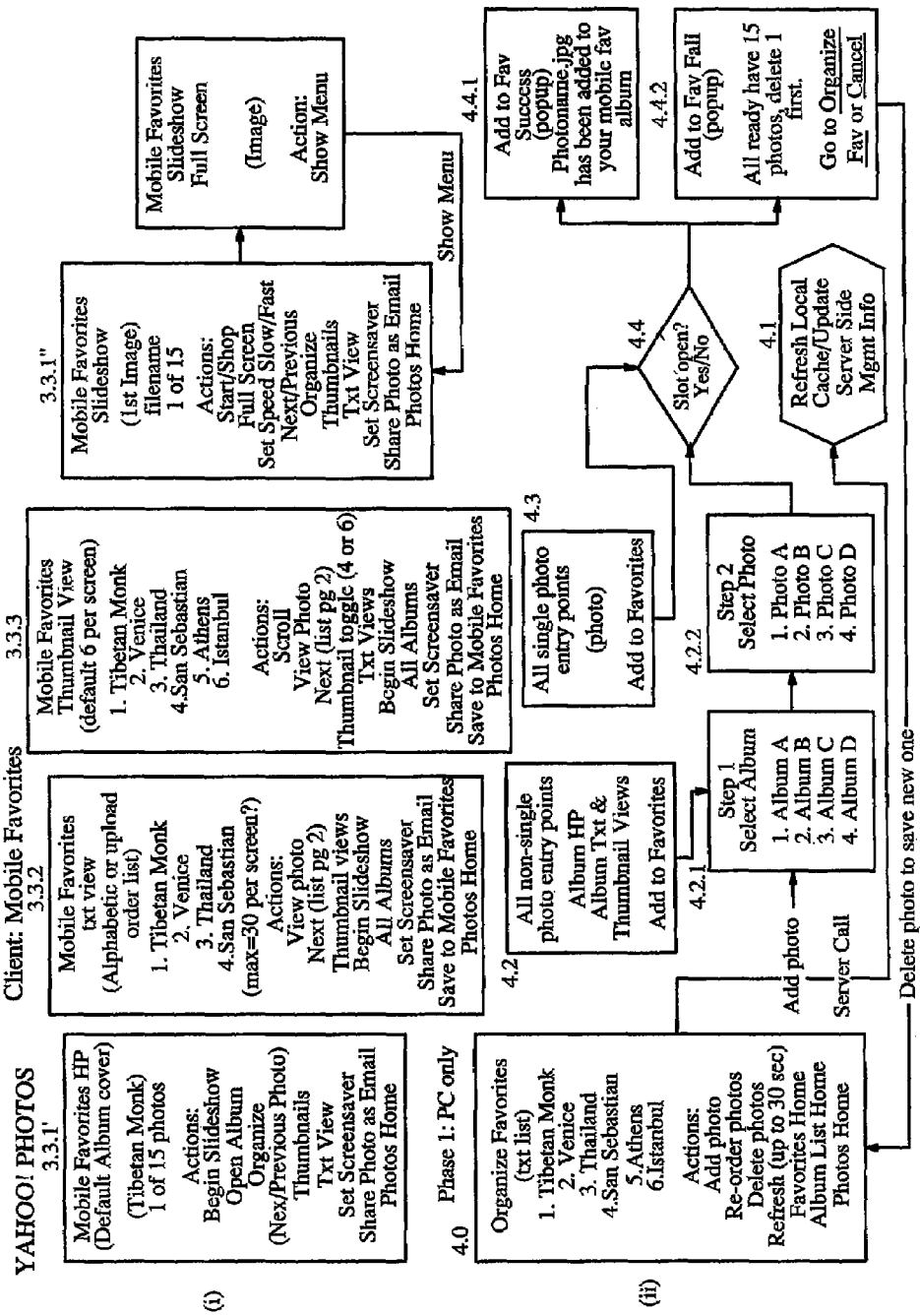
FIG. 5C, parts (i) and (ii), describes setting up favorites for the mobile album slideshow.

Once the Yahoo! Photos program is resident on the mobile phone it can be invoked from the landing page or menu page (using the menu button on the phone to bring up the menu or using the default menu if Yahoo! Photos is presented as one of the default menu options). Invocation of the Yahoo! Photos application allows, among others, user access and manipulation of the user's mobile album as well as online albums in the user account. FIGS. 5A and 5B show the screen flows for online albums and mobile albums, respectively.

Invocation of Yahoo! Photos prompts this program to display the 'home' page 2.0 with two main options: mobile album, and online album (as shown in FIGS. 5A and 5B). The mobile album is an album of photos stored locally on the mobile phone, so that the user need not go out over the network to obtain them. The online album is an album of photos stored on the server in the user's account.

As mentioned before, photo images can be captured and manipulated by the mobile phone outside the Yahoo! Photos environment. These photo images will not be available at the mobile or online albums until they are uploaded to the server and then (selectively or in batch) downloaded from the server. Accordingly, selecting 'online album' allows the user to access and manipulate photo images that have already been uploaded to the server from the user's PC or mobile phone and stored in the online album. The online album is dynamically rendered within the client (mobile device) based on the client-server interactions (i.e., photos are pulled from the server dynamically and placed in the online album). It reflects the exact state of the server at the time of the query and requires a live online connection. To save a photo from the online album to the mobile album the user clicks "Save to Mobile Album." This process takes time, in some instances approximately 10 seconds, depending on the device and network connectivity. Each time this action takes place it is recorded (as backup) by the server.

By analogy, selecting 'mobile album' allows the user to access and manipulate photo images that have been already downloaded from the server and saved in the mobile album. If the user saves, for example, 5 photos to the mobile album, the user is then able to view the 5 photos without again accessing the server via the network (wireless and Internet). Viewing these photos in the mobile album is significantly faster than viewing them in the online album because they are native (present locally) instead of being dynamically pulled from the server over the network.

Then, if the 'online album' option is selected from the Yahoo! Photos client program 'home' page (2.0), as shown in FIG. 5A, it prompts the program to display the next page which is the 'sign-in' page (1.0). It requires the user to follow a sign-in procedure that typically includes providing a Yahoo! ID and user password. The sign-in procedure will, among other things, bring up the user's account and relate it to the user's online albums. That is, the sign-in procedure allows the user to access his account via the Internet (and other proprietary network if applicable).

The next page is the 'my online albums' page (2.1). For the specific user, this online albums page lists the names of photo albums available to the named user which are associated with the user's account. Of course, the album listing includes only albums that are on the server and can be dynamically pulled from it. If the selected album is empty the next page will display an indication to that effect (i.e., "this album is currently empty" at page; 2.1.6). Alternatively, if the album is not empty, selecting that album will bring up the next page, the 'photo list' page for that album (2.1.2). In the 'photo list' page, a photo can be selected for downloading it from the server onto the mobile phone. Additionally, a selected photo can be opened or other actions can be invoked in relation to it. The other actions are presented in a menu that is shown on the screen as a pull-down menu, pop-up menu, or a menu superimposed on any part of the current page (in this example the menu is shown as a pull-down menu).

Such menu (hereafter "photo options menu") provides a number of selection items, each of each representing an action, including: 'save to mobile,' 'email photo,' 'screen saver,' 'thumbnails,' 'online albums,' and 'home.' Each selection brings up a page that corresponds to the selected action item. Two of the action items have already been discussed above, 'home' and 'online album.' Selecting home, will lead the user back to the home page (2.0), and selecting online album, will lead the user to the aforementioned 'my online albums' page (2.1).

Selecting 'thumbnails' brings up a 'photo thumbs' page 2.1.1 that shows a group of thumbnail photo images from the selected album. Note that the number of photo thumb groups downloaded from the server depends on the memory size of the mobile phone (or whatever device is used). With this feature, the user can then thumbnail through the groups of photos in the album. The groups of thumbnail photo images in this album are each loaded from the server. The user can then move between the images back and forth (scroll back and forth) and select any one of the photos in the 'thumbnails' page. A selected thumbnail image will be enlarged in the next page, the 'online photo' page (2.1.3).

As can be seen, each of the pages, 'photo list' (2.1.2), 'photo thumbs' (2.1.1), and 'online photo' (2.1.3), includes the photo options menu feature. Among these action items, when 'save to mobile' is invoked from the 'photo list' page, 'photo thumbs' page, or 'online photo' page, it causes the selected photo image (previously downloaded from the server) to be saved in the mobile album on the mobile phone. The 'added to mobile' page (2.1.7) is brought up in this case to show the photo being saved and to give an indication that saving is done.

When 'email photo' action is invoked, the 'share as email' page comes up (2.1.5). This page shows the photo(s) selected for emailing and prompts the user for the email address. In this implementation, a number of recently-used email addresses are provided. Incidentally, 'email' is simply a transport mechanism which is presently used to send photos from camera phones. Other transport mechanisms may be developed and employed for this application. Then, when the photo is emailed from the mobile phone to the selected e-mail address, a message pops up indicating that the email has been sent or, if not, that an error occurred. For example, a transmission will fail if the user is not authorized to upload photos to the selected e-mail. An error message of this kind is a product of the upload security scheme as embodied in the Yahoo! Photos application program.

When the 'screen saver' action is invoked, the selected photo will be used to populate the screen when the phone is idle, standing by, or starting up. The 'screen saver' option is associated with screen saver page (2.1.4) which shows the selected photo and requires the user to select 'OK' or 'cancel' to add this photo to the screen saver photo roster. A message pops up to indicate the status of the photo download.

Going back to the mobile album is possible with the photo options menu via the 'home' page, using the 'home' option as discussed above. Another way for getting to the mobile album or any other previous page is with the "back" action using the 'back' button. Also, as mentioned above, when the Yahoo! Photos application is invoked from the landing/menu page, the 'home' page (2.0) presents the 'mobile album' as one of the selection items. Accordingly, the mobile album can be accessed directly via the 'home' page.

The mobile album screen flow, shown in FIG. 5B, starts with the 'home' page (2.0) and selection of the mobile album brings up the 'mobile photo' list page (3.1.1). This page presents two action menus, 'open' and 'action.' Thus, selection of any of the listed photos can be followed by selecting 'open' or 'action.' As before, when 'open' is selected the photo is shown on the screen in the 'photo thumbs' page (3.1.2). When 'actions' is selected, a mobile photo action menu is provided. This menu includes action items such as 'slide show,' 'move,' 'delete photo,' 'delete all' (photos), 'thumbnails,' 'history,' and 'home.'

Except for the photos being local (at the mobile album), the thumbnails feature, associated with the 'photo thumbs' page (3.1.2), works as described above with reference to the online album. A photo selected on the mobile 'photo thumbs' page can be enlarged as shown in the next page, the 'mobile photo' page (3.1.3). The menu for the 'photo thumbs' and 'mobile photo' pages includes a subset of the aforementioned mobile photo action menu.

When the slide show is invoked from such a menu the 'mobile slide show' page comes up (3.3). While this feature is active, the slide show scrolls through the mobile album photos, showing each photo for a certain period. The slide show goes on until the user selects 'stop' on the bottom of the page. If the user selects 'actions' a slide show menu gives the user the options of 'pause,' 'show,' 'normal,' and 'fast.' The 'pause' option is selected for pausing the slide show; 'slow' will slow down the slide show, 'speed' will speed up the slide show, and 'normal' will bring it to normal speed. (FIG. 5C, parts (i) and (ii), describes setting up favorites for the mobile album slideshow; part (i) describes the process in the mobile device, and part (ii) describes the process originating at the PC).

Figure 5D:
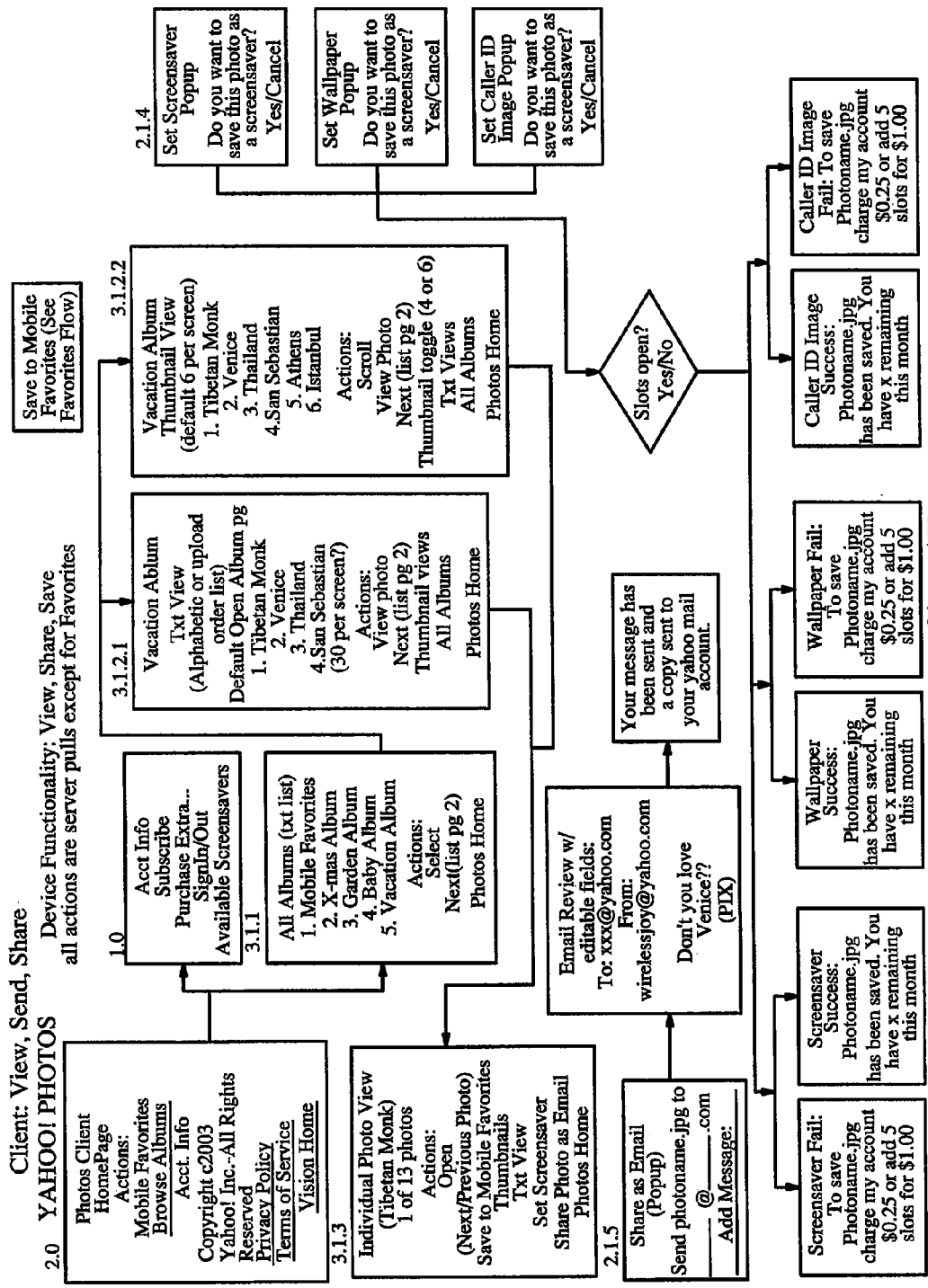
FIG. 5D shows flow diagrams for photos view, share and save.

As further shown in FIG. 5B, the 'move' page comes up (3.2.1) when the 'move' action (referred to also as 'rearrange' action) is selected from any one of the three pages (3.1.1, 3.1.2 and 3.1.3). In this page, the program displays a group of photos (thumbnails) and the user can rearrange the photos using the 5-point navigation key, as well as choose to drop a photo or save it (FIG. 5D shows flow diagrams for photos view, share and save). When the 'delete' or 'delete all' actions are selected, the user has the option of deleting or canceling the delete action (as shown in pages 3.2.5 and 3.2.4). The 'delete' page shows the photo selected for deletion to allow the user to change their mind. When all the photos are deleted, or when the mobile album is empty to begin with, the 'mobile album empty' page is displayed (3.1.4). It allows the user to select the home page or select the answer to any one of the queries, such as "where are my photos?" and "what is the mobile album?." Selection of the latter will bring up the 'about' page (3.1.4.1), and in this page pressing 'OK' provides user access to the online album(s). Selection of the former brings up the 'restore album' page 3.1.4.2. The backup and restore function (also known as the history feature) is later explained in more detail.

As with the previous page ("where are my photos?" page 3.1.4), the 'restore album' page (3.1.4.2) allows the user to go to the 'home' page (2.0). This time, via 'OK', it allows the user to go to the next mobile 'restore album' page (3.1.4.2.1) for a historical photo download list (of photos previously downloaded to the mobile phone).

Figure 5E:
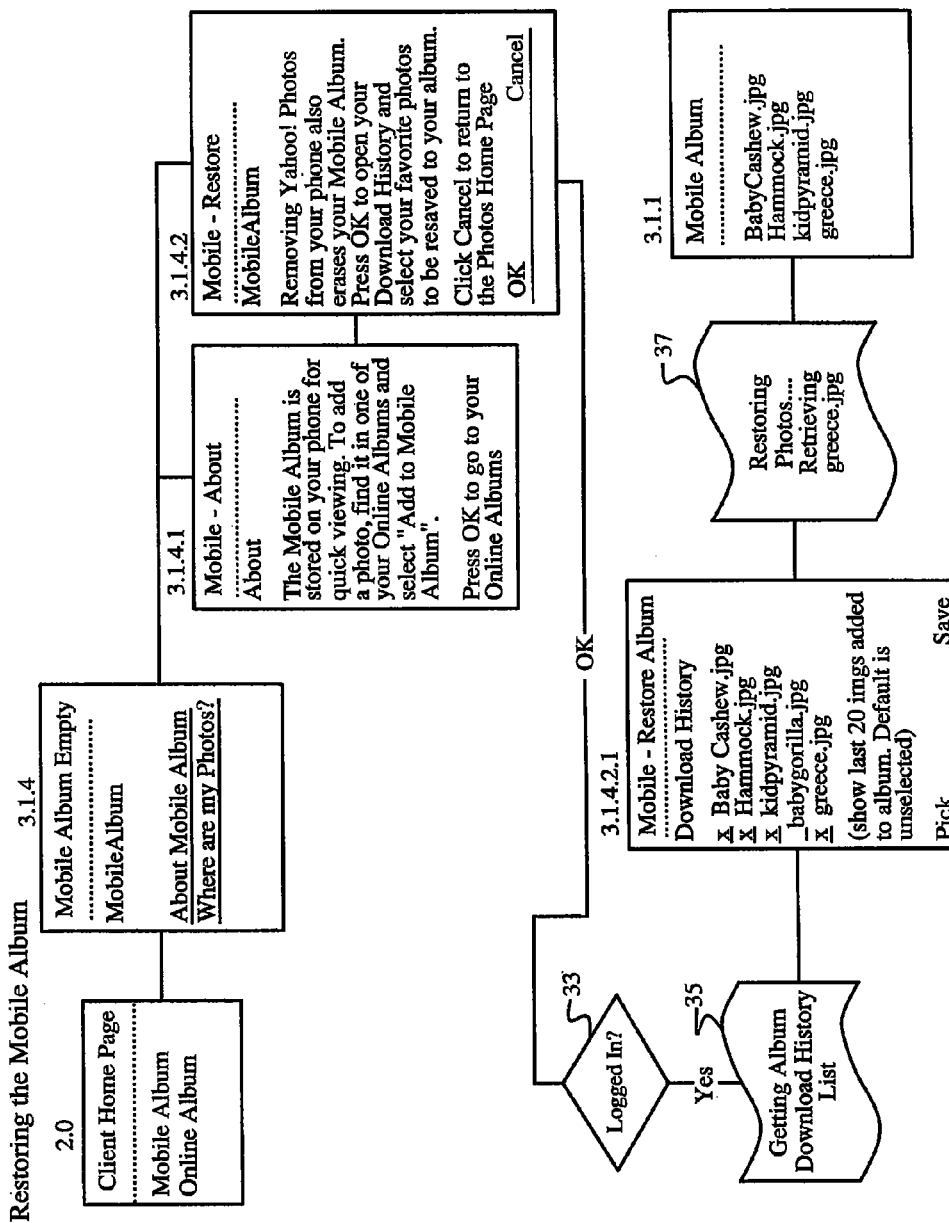
FIG. 5E illustrates the flow of restoring the mobile album from the server backup.

FIG. 5E illustrates the flow of restoring the mobile album from the server backup. Specifically, after traversing the 'home' and 'mobile album empty' pages (2.0 and 3.1.4), the user lends on the 'restore album' page (3.1.4.2). On selecting the 'OK' option, if the user is logged in the Yahoo! Photos server responds with the download history list of photos (steps 33, 35). This response prompts the mobile device to bring up the 'restore album' page (3.1.4.2.1) with the download history list of, say, 20 last photos that were added to the mobile album. From this historical list, the photos can be picked (see, e.g., checkmarks) and then the selected photos can be restored to the mobile album using the save/cancel menu options. The selected photos are then downloaded from the server in a batch process (step 37). The mobile album is then available for user access via 'mobile album' page (3.1.1).

Note that the pages shown in FIGS. 5A-5E and discussed herein are exemplary rather than exhaustive, and they do not necessarily include all possible pages (or user interaction cards) that a photo application such as Yahoo! Photos presents. Moreover, the reference designations (call-out numbers) typically refer to the pages themselves rather than any portion of their content. Where applicable, similar pages appear in different figures with the same call-out numbers, e.g., home page 2.0, although their respective contents can vary slightly.

While FIG. 5E illustrates one aspect of backup and restore in the context of Yahoo! Photos, namely the flow or restoring the mobile album from the server backup, the principles of backup and restore are discussed more fully below. When the client Yahoo! Photos application is run, various user actions (e.g., navigation), choices of preferences, photo downloads to the mobile album and the like are experienced at the mobile device. The navigation history, mobile album, choices of preferences and the like are the memory items which form the historical record for the particular application.

Historical records are maintained in a storage area associated with the client application. Because mobile devices have a limited memory space that frequently causes them to reach full or near full capacity, users are frequently forced to swap between client applications (i.e., discard unused applications). However, deleting a client application is likely to result in the clearance of this storage area. Moreover, in most carrier-provided vending machines for client applications or in typical application provider's websites, only the client-side applications rather than the actual files with the memory items are available. When the user chooses to delete or "upload" their application to a vending machine, the user is actually deleting the JAR/JAD files (with the historical record). Thus, when a user re-loads an application from either the vending machine or the application provider's own website, the application being delivered is an entirely new client-side application. The new application has no inherent basis of knowledge of the "memory items" from the previously discarded application. This is because the protocols, including current J2ME and other protocols, eliminate the historical record even when the user merely upgrades the application to a new version. Also, when the user replaces one mobile device with another, the historical record related to the client-side application in the first mobile device is not available in the replacement mobile device.

Figure 6A:
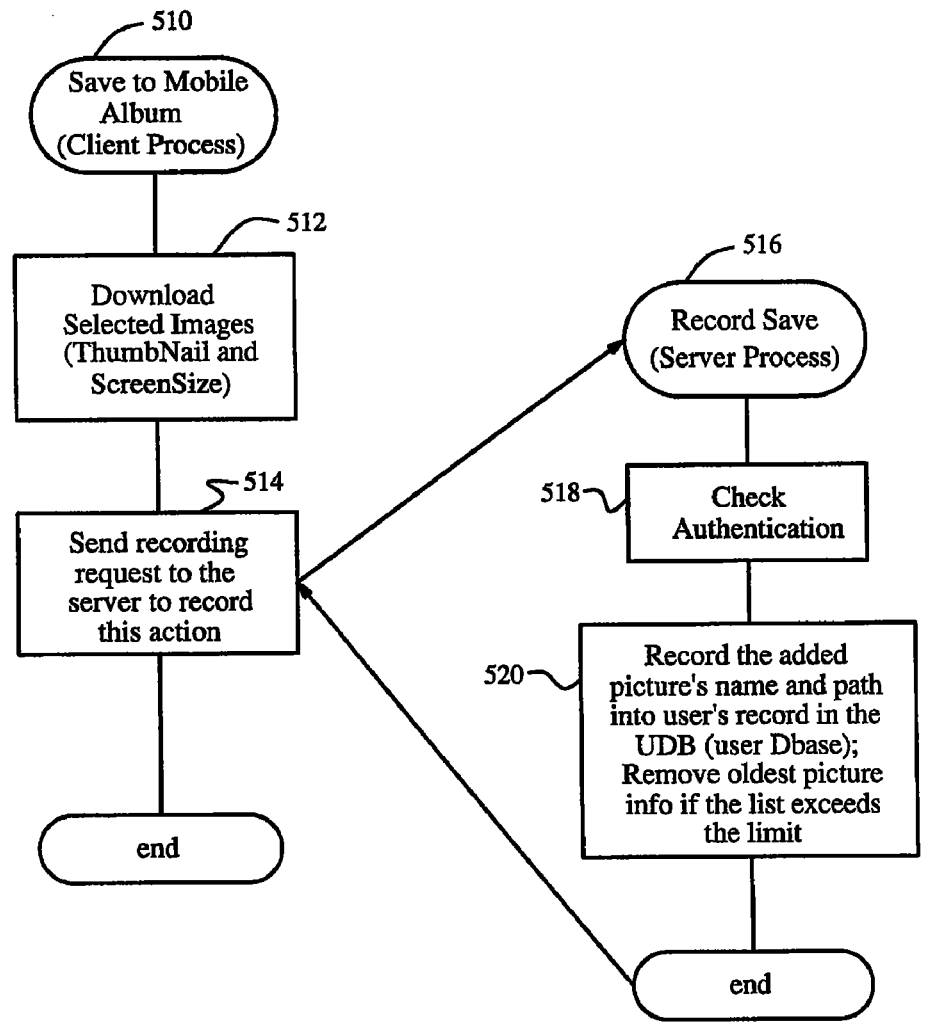
FIGS. 6A-C illustrate the backup and restore functionality and system components implemented for the Yahoo! Photos application.
Figure 6B:
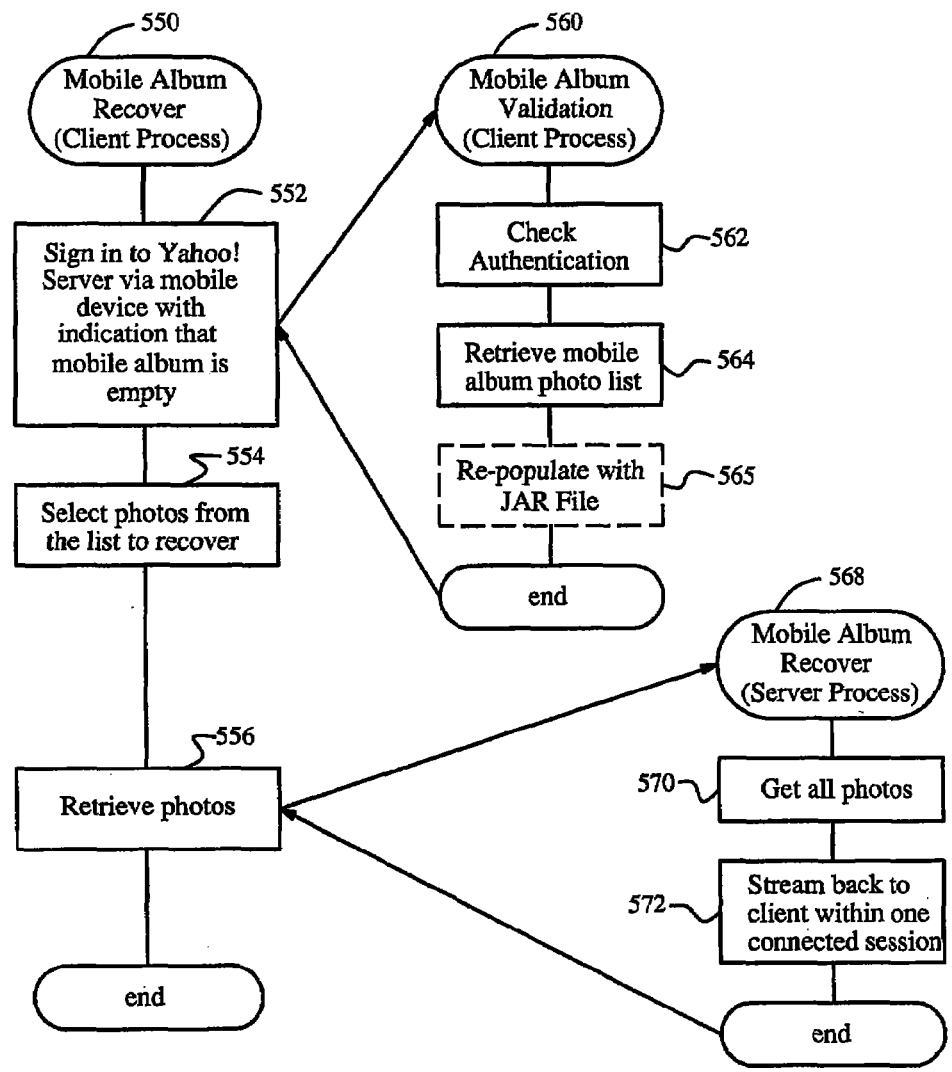
Figure 6C:
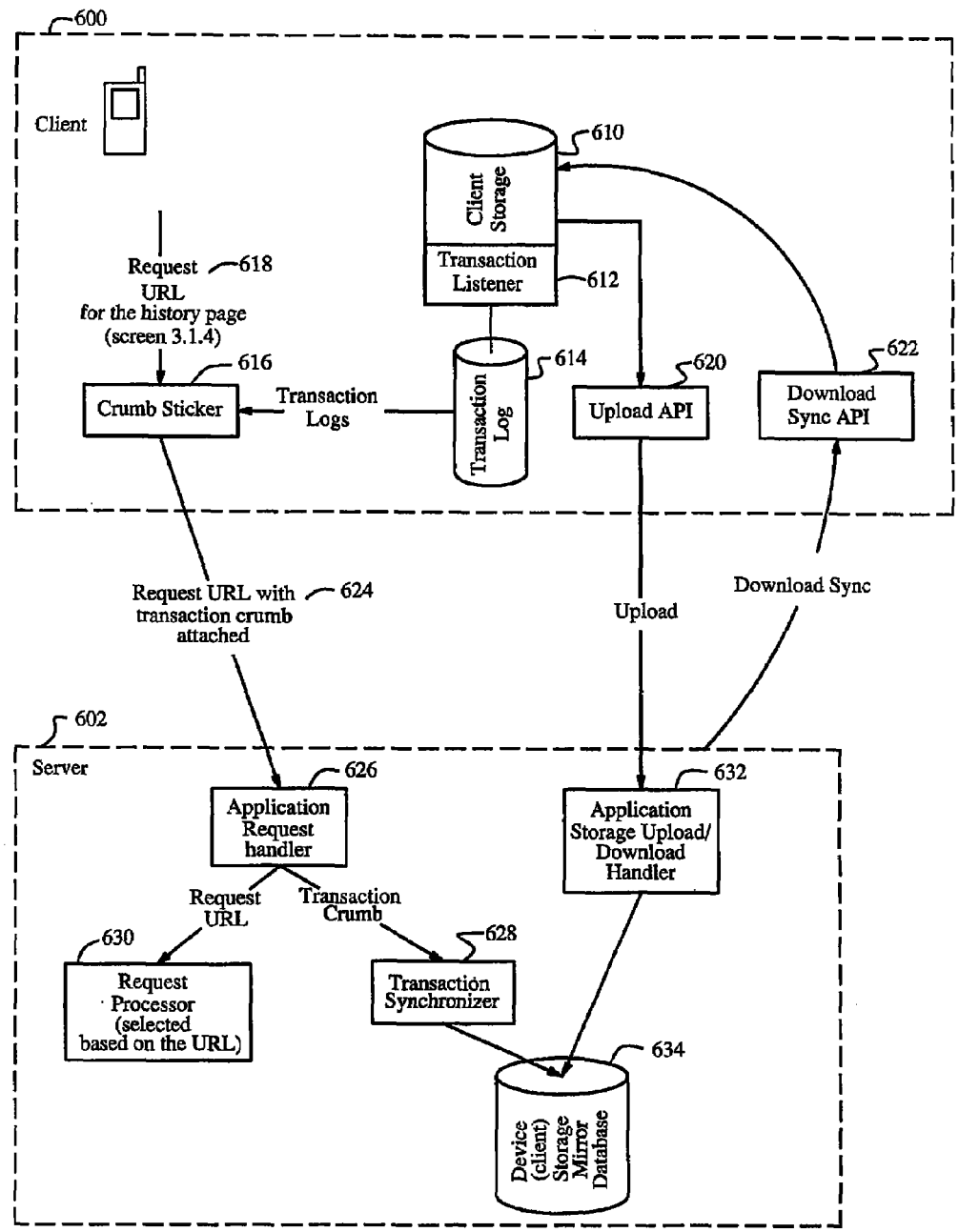

Accordingly, a server-client backup and restore system is provided in which the historical records (memory items) are saved and from which the historical records can be restored. The software aspects of this functionality are embodied in the client-side applications and their supporting server handlers. FIGS. 6A-6C illustrate the backup and restore functionality and system components implemented for the Yahoo! Photos application.

In the context of the Yahoo! Photos program, as shown in FIG. 6A, the backup and restore system records a history of memory items on the Yahoo! server each time a "recordable" action is taken 514. A recordable action in this context is, for example, the saving of a photo from an online album to a mobile album or rendering the online album. In the Yahoo! server, photos are recorded along with their name and path into the user's record in the database 520. Typically, the user is allocated room for a given number of photos, and if that number is exceeded old photos are discarded 520. In the mobile device, the mobile album is the local collection of photos downloaded 512 from the online album and now living within the JAR file.

It is important to remember that although the backup and restore functionality (i.e., the history feature) is described in the context of the Yahoo! Photos program, it is useful in any mobile device application where backup is desired. Thus, although this feature is implemented for the Yahoo! Photos application, it can be implemented more generically for other applications.

In the context of Yahoo! Photos, every photo from the user's online album that is saved to the mobile album is 'remembered' by the server. Indeed, any action (for example, the history required for the back in sequence implementation), not just a photos download history, can be recorded as a backup on the server side 514. Preferably, since the page traversal path is not predictive the history is recorded accurately and fully. Thus, if the Yahoo! Photos program is erased, for any reason, from the mobile phone memory and the user then reloads it, the backup historical record is retrieved to restore the historical record. This is made possible with the association of the user's Yahoo! ID to the user's historical record on the server.

Note that each mobile phone device is distinctly identified to the server, and a user may have more than one device. Therefore, each device can in principle have its own distinct historical record on the server. However, when the user first establishes or later updates his account it can be arranged that the user's Yahoo! ID is associated with a plurality of mobile phones. Then, the user can sign in and have access to his historical record on the server from any one of these mobile phones.

Because of the backup, at any given time, the historical record with all the "memory items" resides not only at the client in the storage area but also at the Yahoo! server. However, upon deleting the client Yahoo! Photo application the action of deleting the archive (JAR/JAD) file and associated storage area from a user's mobile device is not captured by the Yahoo! server because this action does not involve network connectivity. After that point, the mobile device may deviate in data from the server. When a user intends to download a new version of Yahoo! Photos, the user must first log in to the new client application with his Yahoo! ID and password so that the Yahoo! server can associate the Yahoo! ID with the historical record. Thus, when a new "login" event occurs (i.e., when a Yahoo! Photos application attempts to validate itself), the Yahoo! server determines whether the application is "in synchronization," i.e., the historical record in not synchronized. Upon realizing that the application is not in synchronization or is new, the server then provides the user with a list of the previous photos.

In one implementation, as shown in FIG. 6B, when a client logs in to the Yahoo! server to fetch the online album, it knows the state of the "trigger" (in this case the trigger is the fact that the mobile album is empty 552). This "trigger" results in the server being able to trigger the restoration of the "memory items" (in this case, for example, the history of mobile album photo downloads 564). The user selects the photos to download 554 and then they are sent to the user in a batch process 556, thereby saving the trouble of having to individually select and download each one separately.

Rather than having the user select the items from the historical record to be restored, these items can be provisioned to the application automatically once the user logs in to the new application. Specifically, when the user logs in after re-downloading the client Yahoo! Photos application, the Yahoo! ID and password are validated by the Yahoo! server. Because the specific Yahoo! ID shows up as having used the Yahoo! Photos application before, the Yahoo! server pulls the photos and re-sends them to the mobile device without any further interaction (steps 570, 572). The re-downloaded client Yahoo! photos application starts to retrieve the historical record and it continues to retrieve photos until the Yahoo! server has no more photos on its list and/or the mobile device memory is full. In the second case, the client Yahoo! photos simply stops the sequence of requesting the photos.

Where the Yahoo! server, rather than the carrier (e.g., AT&T Wireless), hosts the new application for re-load, the Yahoo! server pre-populates 565 the historical record in the JAR file prior to its delivery to the user. This is possible because the Yahoo! server knows the Yahoo! ID for the user who is logged in and can associate the Yahoo! ID with the user's backup. In this case, the user's mobile album can be pre-populated with additional photos or any other personalization and/or preference up to the maximum size of the file allowed by the carrier's systems.

As shown in FIG. 6C, which illustrates the backup and restore system configuration, the system contains modules that reside in the client-side application as well as in the server handlers. The device storage mirror database 634 maintains the backup of client-side application data (i.e., memory items, historical record). This database is indexed based on user IDs. Synchronization is done at two different levels, transaction level and upload level.

At the transaction-level Synchronization, in the mobile device (i.e., the client 600), a transaction listener 612 monitors transactions and record these transactions in the transaction log 614. For any client request 618 (e.g., downloading a photo or any other recordable action) that is going to the server 602, the crumb sticker 616 attaches the transaction with a crumb. The crumb is simply a string that represents transactions occurring at the client. On the server side 602, the application request handler 626 separates the crumb from the request and passes it to the transaction synchronizer 628. The transaction synchronizer modifies the device storage mirror database 634 according to the transactions it receives.

At the upload synchronization level, the client 600 can initiate a batch job request to upload the current client data to the application server 602. The upload handler 632 processes the data (historical record) and saves it in the database record at the device storage mirror database 634.

Figure 7:
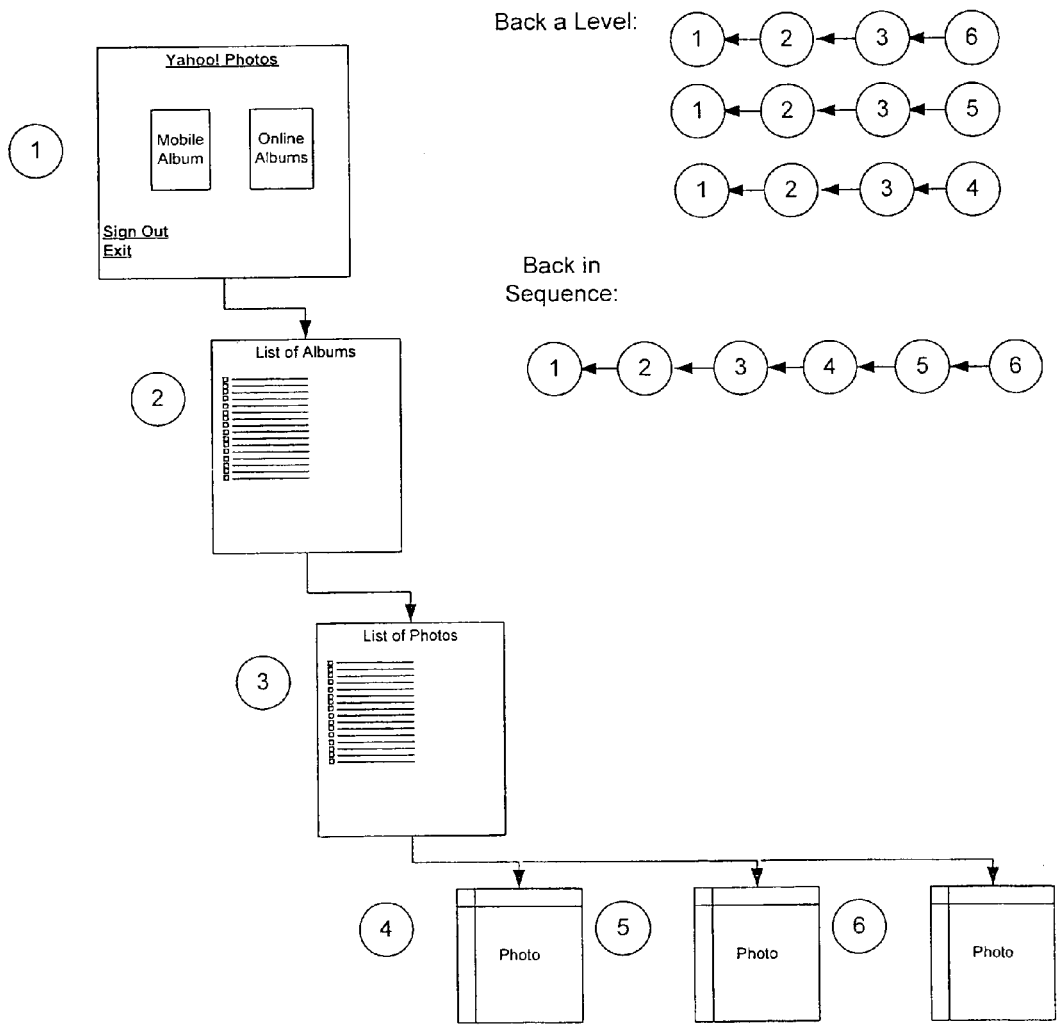
FIG. 7 provides a simplified diagram to illustrate the back button feature.

One navigation feature of the Yahoo! Photos that benefits from the aforementioned backup and restore of history records is the back functionality, particularly the back in sequence functionality. As to navigating through the pages on the mobile phone, the pages can be traversed forward as described above and they can be traversed backwards using the "back button" feature. FIG. 7 provides a simplified diagram to illustrate the "back button" feature.

As can be seen, the "back a level" mode allows hierarchical backwards sequence traversal one level each time the 'back' button is touch activated or clicked (hereafter "clicked"). The "back in sequence" mode allows sequential backwards one page each time the 'back' button is pressed. For example, in back a level mode, back a level takes the application from a photo page (e.g., 6) one level up to the list of photos page (3); and from there one more level up to the list of albums page (2) and one more level up to the home page (1). As can be further seen in this example, the back in sequence mode functions to take the application from the current photo page (6) to the former photo page (5), rather than up one level (3), when the back button is touched. Additional activations of the back button will traverse through all the pages in reverse sequence.

It makes no difference if the "back button" feature is used while in the online album or mobile album part of the application. The principles apply equally well to both situations. Either way, the steps (pages traversed) are remembered, and they can be recorded server side, locally, or both on the server side and locally.

In view of the above, the backup and restore functionality allows backup of a historical record with memory items related to a client-side application running on the mobile device. This functionality allows restoration of the historical record for the client-side application, or a new version thereof, when re-downloaded to the mobile device. Backup and restore reduces the navigation required for restoring the historical record and in some cases, such as back in sequence, it enables preservation and restoration of memory items that otherwise would be lost and have to be recreated.

Implementation Details

Additional implementation details associated with the foregoing description are provided below. These implementation details include an initial list of devices, soft key mapping, labels, global elements and screen flows tables for the online albums and mobile albums. These details are described in the following pages.

Possible Mobile Devices

The visual and interaction design as described herein should accommodate various types of mobile devices, including, for example, those listed in the table below.

| VENDOR | MODEL | USABLE PIXEL DIMENSIONS |
| --- | --- | --- |
| Audiovox | 8450 | 128 × 112 |
| Samsung | A660 | 128 × 146 (without Soft key) |
| | | 128 × 131 (with Soft key: 15) |
| Sanyo | RL2000 (7200) | 120 × 112 (include soft key) |
| Sanyo | RL2500 (5400) | 132 (W) × 160 (H) including Soft key |
| Sanyo | 5500 | 132 (w) × 160 (h) including Soft key |
| Sony Ericsson | T608 | 128 × 114 pixels |
| Toshiba | 9950 | 261 × 240 |
| Hitachi | SH-P300 | 120 w × 130 h |
| LG | 5350 | 120 × 96 |
| Samsung | A500 | 128 × 146 (without Soft key) |
| | | 128 × 131 (with Soft key: 15) |
| Samsung | N400 | 128 × 114 (without Soft key) |
| | | 128 × 102 (with Soft key: 12) |
| Samsung | A600 | 128 × 146 (without Soft key) |
| | | 128 × 131 (with Soft key: 15) |
| Samsung | VGA1000 | 128 × 146 (without Soft key) |
| | (A620) | 128 × 131 (with Soft key: 15) |
| Sanyo | 4900 | 120 × 112 includes Soft key |
| Sanyo | 5300 | 132 × 160 (includes soft key) |
| Sanyo | 8100 | 128 × 120 (with soft key) |
| | | 120 × 112 (without Soft key) |

Soft Key Mapping

For the purpose of this invention, the following keys are available on the mobile devices: Up; Down; Left; Right; Select/OK; Left Soft key; Right Soft key; and Back. If a device does not have an obvious select key, it is assumed that the MIDP (mobile information device profile) implementation will automatically provide a select option at one of the soft keys or in one of the soft key menus.

| KEY MAPPING | |
| --- | --- |
| Up | Scrolls the cursor up, or selects the previous item in a list. |
| Down | Scrolls the cursor down, or selects the next item in a list. |
| Left | Scrolls the cursor left if possible. |
| Right | Scrolls the cursor right if possible. |
| Select | LINK OR BUTTON: Go to appropriate screen |
| | EXCLUSIVE LIST (Radio buttons): Selects the radio button. |
| | MULTIPLE LIST (Checkboxes): Checks and un-checks the checkboxes. |
| | TEXTBOX: Takes the user to the text editor |
| | TEXT STRING: Does nothing |
| Two Soft keys | Soft key functionality varies greatly among devices. The ordering and positioning of options can't be controlled with any degree of accuracy; the order shown indicates only the relative importance of the options. |
| | In the examples presented herein, options are assigned a type (BACK, EXIT, ITEM) |

-continued

| | KEY MAPPING |
|---|---|
| | The following layout is preferred:<br>Item 1: primary soft key<br>Item 2: If no others are present, secondary soft key should have item 2 as its label. If additional items are available they should be listed in priority order in the menu, which is accessed via the secondary soft key.<br>Primary soft key should have the same function as the 'Enter'/'OK' key |
| Back | 'Back' button links back to previous screen.<br>Does NOT link one level up in the navigation tree, unless that is the previous screen.<br>Does not link back to confirmation or error popups.<br>When technical constraints exist, data previously entered into fields may not be shown when user navigates back to a page. However, actual implementations may differ based on the technical constraints. |
| Default Selection | In general, the first item on a page is pre-selected (default item) unless the user has performed some action, like viewing or renaming an image. |
| Misc. keys | If arrow buttons on the side of the phone are available they should scroll down an entire page in a list or thumbnail screen.<br>Image names should appear bold/strong when displayed on an instructional screen, e.g. 2.1.4. Normal text should be used for lists of images.<br>In this document any underlined item is a link. Actual presentation of links, whether underlined or other, is determined by the device. |

Soft Key & Menu Labels

In a representative implementation, labels that may appear on a soft key are restricted to 7 characters. Menu-only items are restricted to 14 characters.

Common Labels

| | |
|---|---|
| OK | Performs the default action for a screen or for a selected item. Moves the user forward in a task. (e.g., opens an album or photo.) |
| Cancel | Used in addition to "Back" when an action was initiated and can be cancelled.<br>Cancel usually performs same action as back, but is displayed to increase user confidence that the action was cancelled. |
| Edit | When possible, "Edit" links to a textbox editing screen. |
| Open | Opens a folder, message, file, etc. Should not be used for links not associated with files, folders, etc. |
| Back | "Back" label should be used only for the Back function described above. If possible, Back should always map only to the device back button. |
| Home | Links to the home screen of the MIDlet. |

Global Elements

Confirmation Screen

One type of global elements, presented as "Confirm Popup" screens, are used for displaying a confirmation to the user. The confirmation popup screens contain simple text such as "Done" or "Saved", and they disappears automatically after a short time.

In Progress Screen

The "in progress" screen informs the user that the application is waiting for a response from the server or is processing a request. Each device has a default screen with text and a moving graphic, and, alternatively, it is replaced with a Yahoo! Canvas screen.

Screen Flows: Online Albums

As described above, the online album pages are made available to the user in forward and backwards traversal; each page having default selection items associated with it. The forward traversal starts, of course, with the home page (2.0). The following tables outline for each page separately the default selection items available in that page for screen flows.

| 2.0 J2ME Client Home | | | | | |
|---|---|---|---|---|---|
| Default Selection | Mobile Album | | | | |
| Actions | Label | Function | Pref. Location | Type | Priority |
| | | Left soft key opens selected page. Numbers 1, 2, 3, 4 also open pages. | Primary Soft key, OK Button | ITEM | 1 |
| | Enter/OK | Open | | | |
| | Up Arrow | Select previous item | | | |
| | Down Arrow | Select next item | | | |
| | Left Arrow | Select next item | | | |
| | Right Arrow | Select previous item | | | |
| | Comments | Descriptive text and/or graphics will be added to this screen. Icons may be used in place of text links. "Sign Out" appears only when user is signed in. | | | |

| 1.0 Sign In | | | | | |
|---|---|---|---|---|---|
| Default Selection | ID Field. | | | | |
| Actions | Label | Function | Pref. Location | Type | Priority |
| | Edit | Opens selected textbox for editing | Primary Soft key, OK Button | EDIT | 1 |
| | SignIn | Submits Form | Secondary Soft key | OK | 1 |
| | Back | 2.0 J2ME Client Home | Back button | BACK | 1 |

-continued

1.0 Sign In

| | |
|---|---|
| Up Arrow | Jumps up. |
| Down Arrow | Jumps down. |
| Left Arrow | — |
| Right Arrow | — |
| Comments | Cache as much as legally & technically possible. |

2.1 My Online Albums

| | |
|---|---|
| Default Selection | First Album, or last selected album in current session. |
| Primary Soft key | Open. Same as Enter. |

| Actions | Label | Function | Pref. Location | Type | Priority |
|---|---|---|---|---|---|
| | Open | Opens selected album to last-used view - 2.1.1 or 2.1.2. List is default. If album contains no images, opens 2.1.6 Photos List Empty. | Primary Soft key, OK Button | ITEM | 1 |
| | Back | Previous screen. | Back button | BACK | 1 |

| | |
|---|---|
| Up Arrow | Jumps to previous item in list. If top item is selected, does nothing. |
| Down Arrow | Jumps to next item in list. If last item is selected, does nothing. |
| Left Arrow | — |
| Right Arrow | — |

2.1.1 Photos Thumbs

| | |
|---|---|
| Default Selection | One thumbnail is always selected. Selection is indicated by 2 pixel black border. When scrolling to a page either (1) or (4) is selected. When returning from a list view, full-screen view, or action screen the last selected image is selected. |

| Actions | Label | Function | Pref. Location | Type | Priority |
|---|---|---|---|---|---|
| | Open | Opens 2.1.3 Online Photo NOTE: pressing 1, 2, 3, or 4 opens the photo currently in that position. | Primary Soft key, OK Button | ITEM | 1 |
| | Add to Mobile Album | Saves image to mobile album and opens 2.1.7 Added to Mobile | Menu | ITEM | 2 |
| | Screen Saver | Links to 2.1.4 Save as Screensaver | Menu | ITEM | 3 |
| | Email Photo | Links to 2.1.5 Share as Email | Menu | ITEM | 3 |
| | Photo List | Links to 2.1.2 Photo List | Menu | SCREEN | 1 |
| | Online Albums | Links to 2.1 My Online Albums | Menu | SCREEN | 2 |
| | Home | Links to 2.0 J2ME Client Home | Menu | SCREEN | 3 |
| | Back | Previous screen | Back button | BACK | 1 |

| | |
|---|---|
| Up Arrow | When (3) or (4) is selected, jumps up to (1) or (2). When (1) or (2), moves up one row. |
| Down Arrow | When (1) or (2) is selected, jumps down to (3) or (4). When (3) or (4), moves down one row. |
| Left Arrow | Cycle through all thumbs on the screen, (4)-(1) then to the row above. Rows are added one at a time, so the top row shifts down when a new row is loaded. |
| Right Arrow | Cycle through all thumbs on the screen, (1)-(4) then to the row below. Rows are added one at a time, so the bottom row shifts up when a new row is loaded. |
| Comments | List loops back to beginning when user reaches last image. When looping to the beginning, the full screen refreshes with 2 rows of images. Each photo is surrounded by 2 pixels of white space. The selected photo has a 2 pixel black border. |

2.1.2 Photo List

| | |
|---|---|
| Default Selection | One item is always selected. When returning from a thumbnail view, full-screen view, or action screen the last selected image is selected. After deleting, the image in the spot that contained the deleted image is selected. |

| Actions | Label | Function | Pref. Location | Type | Priority |
|---|---|---|---|---|---|
| | Open | Opens 2.1.3 Online Photo | Primary Soft key, OK Button | ITEM | 1 |
| | Add to Mobile Album | Saves image to mobile album | Menu | ITEM | 2 |
| | Screen Saver | Links to 2.1.4 Save as Screensaver | Menu | ITEM | 3 |
| | Email Photo | Links to 2.1.5 Share as Email | Menu | ITEM | 3 |
| | Thumbnails | Links to 2.1.1 Photo Thumbs | Menu | SCREEN | 1 |
| | Online Albums | Links to 2.1 My Online Albums | Menu | SCREEN | 2 |
| | Home | Links to 2.0 J2ME Client Home | Menu | SCREEN | 3 |
| | Back | Previous screen | Back button | BACK | 1 |
| Up Arrow | | Jumps to previous item in list. If top item is selected, does nothing. | | | |
| Down Arrow | | Jumps to next item in list. If last item is selected, does nothing. | | | |
| Left Arrow | | — | | | |
| Right Arrow | | — | | | |
| Comments | | File extensions are displayed. Items are displayed in order specified by the Yahoo! Photos system. User cannot rename, delete, or move photos. | | | |

2.1.3 Online Photo

| | |
|---|---|
| Default Selection | — |

| Actions | Label | Function | Pref. Location | Type | Priority |
|---|---|---|---|---|---|
| | Done | Links to 2.1.1 or 2.1.2 | Primary Soft key | SREEN | 1 |
| | Add to Mobile Album | Saves image to mobile album | Menu | ITEM | 2 |
| | Screen Saver | Links to 2.1.4 Save as Screensaver | Menu | ITEM | 3 |
| | Email Photo | Links to 2.1.5 Share as Email | Menu | ITEM | 3 |
| | Online Albums | Links to 2.1 My Online Albums | Menu | SCREEN | 2 |
| | Home | Links to 2.0 J2ME Client Home | Menu | SCREEN | 3 |
| | Back | Previous screen | Back button | BACK | 1 |
| Up Arrow | | — | | | |
| Down Arrow | | — | | | |
| Left Arrow | | Jumps to previous image in gallery. | | | |
| Right Arrow | | Jumps to next image in gallery. | | | |
| Comments | | Image should be as large as possible on any particular screen. | | | |

2.1.4 Save as Screensaver

| | |
|---|---|
| Default Selection | Text entry field |

| Actions | Label | Function | Pref. Location | Type | Priority |
|---|---|---|---|---|---|
| | OK | Initiates PCS Vision download process. | Primary Soft key, OK Button | SCREEN | 1 |
| | Cancel | Cancels operation and returns to previous screen | Second Soft key | SCREEN | 2 |

-continued

2.1.4 Save as Screensaver

|  | Back | Previous screen | Back button | BACK | 1 |
|---|---|---|---|---|---|
| Up Arrow | — | | | | |
| Down Arrow | — | | | | |
| Left Arrow | | | | | |
| Right Arrow | | | | | |
| Comments | | | | | |

2.1.5 Share as Email

| Default Selection | Text entry field | | | | |
|---|---|---|---|---|---|

| Actions | Label | Function | Pref. Location | Type | Priority |
|---|---|---|---|---|---|
| | Send | Send. Sends email to recipients and user with link to image on web. Confirmation pops up for a moment, then user is returned to 2.1.1, 2.1.2, or 2.1.3. If email address was not formed correctly an error appears. | Secondary Soft key | ITEM | 1 |
| | Edit/Pick/OK | Opens textbox for editing, toggles state of checkbox, or sends. | Primary Soft key, OK Button | | 1 |
| | Back | Previous screen | Back button | BACK | 1 |
| Up Arrow | — | | | | |
| Down Arrow | — | | | | |
| Left Arrow | — | | | | |
| Right Arrow | — | | | | |
| Comments | | | | | |

2.1.6 Photo List Empty

| Default Selection | | | | | |
|---|---|---|---|---|---|

| Actions | Label | Function | Pref. Location | Type | Priority |
|---|---|---|---|---|---|
| | Back | 2.1 My Online Albums | Back button | BACK | 1 |
| Up Arrow | — | | | | |
| Down Arrow | — | | | | |
| Left Arrow | — | | | | |
| Right Arrow | — | | | | |

2.1.6 Photo List Empty (continued)

| Comments | Displayed for a moment, then automatically links back to 2.1 My Online Albums |
|---|---|

Screen Flows: Mobile Album

As with the online album, the mobile album pages are made available to the user in forward and backwards traversal; each page having default selection items associated with it. Here again, the forward traversal starts, of course, with the home page (2.0). The following tables outline for each page separately the default selection items available in that page for screen flows.

| | 3.1.1 Mobile Photo List | | | | |
|---|---|---|---|---|---|
| Default Selection | One item is always selected. When returning from a thumbnail view, full-screen view, or action screen the last selected image is selected. After deleting, the image in the spot that contained the deleted image is selected. | | | | |
| Actions | Label | Function | Pref. Location | Type | Priority |
| | Open | Opens selected photo in 3.1.3 Mobile Photo | Primary Soft key, OK Button | ITEM | 1 |
| | Slideshow | Links to 3.3 Mobile Slideshow, starting show with current photo | Menu | ITEM | 2 |
| | Move | Links to 3.2.1 Move | Menu | ITEM | 4 |
| | Delete | Links to 3.2.4 Delete | Menu | ITEM | 4 |
| | Thumbnails | Links to 3.1.1 Mobile - Photo Thumbs | Menu | SCREEN | 1 |
| | Home | Links to 2.0 J2ME Client Home | Menu | SCREEN | 2 |
| | Back | Previous screen | Back button | BACK | 1 |
| Up Arrow | Jumps to previous item in list. If top item is selected, does nothing. | | | | |
| Down Arrow | Jumps to previous item in list. If last item is selected, does nothing. | | | | |
| Left Arrow | — | | | | |
| Right Arrow | — | | | | |
| Comments | File extensions are not displayed. | | | | |

| | 3.1.2 Mobile Photo Thumbs | | | | |
|---|---|---|---|---|---|
| Default Selection | One thumbnail is always selected. Selection is indicated by 2 pixel border. When returning from a list view, full-screen view, or action screen the last selected image is selected. After deleting, the image in the spot that contained the deleted image is selected. After Moving, the last moved image is selected. | | | | |
| Actions | Label | Function | Pref. Location | Type | Priority |
| | Open | Opens 3.1.3 Mobile Photo NOTE: pressing 1, 2, 3, or 4 opens the photo currently in that position. | Primary Soft key, OK Button | ITEM | 1 |
| | Slideshow | Links to 3.3 Mobile Slideshow, starting show with current photo | Menu | ITEM | 2 |
| | Move | Links to 3.2.1 Move | Menu | ITEM | 4 |
| | Delete | Links to 3.2.4 Delete | Menu | ITEM | 4 |
| | Photo List | Links to 3.1.1 Mobile-Photo List | Menu | SCREEN | 1 |
| | Home | Links to 2.0 J2ME Client Home | Menu | SCREEN | 2 |
| | Back | Previous screen | Back button | BACK | 1 |
| Up Arrow | When (3) or (4) is selected, jumps up to (1) or (2). When (1) or (2), moves up one row. | | | | |
| Down Arrow | When (1) or (2) is selected, jumps down to (3) or (4). When (3) or (4), moves down one row. | | | | |
| Left Arrow | Cycle through all thumbs on the screen, (4)-(1) then to the row above. Rows are added one at a time, so the top row shifts down when a new row is loaded. | | | | |
| Right Arrow | Cycle through all thumbs on the screen, (1)-(4) then to the row below. Rows are added one at a time, so the bottom row shifts up when a new row is loaded. | | | | |

-continued

3.1.2 Mobile Photo Thumbs

| | |
|---|---|
| Comments | List loops back to beginning when user reaches last image. When looping to the beginning, the full screen refreshes all 4 images.<br>When an image is deleted all other images move to fill the empty space<br>Each photo is surrounded by 2 pixels of white space. The selected photo has a 2 pixel border. |

3.1.3 Mobile Photo

| | | | | | |
|---|---|---|---|---|---|
| Default Selection | — | | | | |

| Actions | Label | Function | Pref. Location | Type | Priority |
|---|---|---|---|---|---|
| | Done | Album. Links to most recent view of album - 3.1.1 or 3.1.2 - with most recently viewed image selected. | Primary Soft key, OK Button | ITEM | 1 |
| | Slideshow | Links to 3.3 Mobile Slideshow, starting show with current photo | Menu | ITEM | 2 |
| | Move | Links to 3.2.1 Move | Menu | ITEM | 4 |
| | Delete | Links to 3.2.4 Delete | Menu | ITEM | 4 |
| | Home | Links to 2.0 J2ME Client Home | Menu | SCREEN | 2 |
| | Back | Previous screen | Back button | BACK | 1 |
| Up Arrow | — | | | | |
| Down Arrow | — | | | | |
| Left Arrow | Jumps to previous image in gallery. When first image is reached, loops to end. | | | | |
| Right Arrow | Jumps to next image in gallery. When last image is reached, loops to beginning. | | | | |
| Comments | Image should be as large as possible on any particular screen. | | | | |

3.1.4 Mobile Album Empty

| | | | | | |
|---|---|---|---|---|---|
| Default Selection | My Online Albums | | | | |

| Actions | Label | Function | Pref. Location | Type | Priority |
|---|---|---|---|---|---|
| | OK | | Primary Soft key, OK Button | ITEM | 1 |
| | Back | Previous screen | Back button | BACK | 1 |
| Up Arrow | — | | | | |
| Down Arrow | — | | | | |
| Left Arrow | — | | | | |
| Right Arrow | — | | | | |
| Comments | | | | | |

3.1.4.1 Mobile- About

| | |
|---|---|
| Default Selection | My Online Albums |

3.1.4.1 Mobile- About

| Actions | Label | Function | Pref. Location | Type | Priority |
|---|---|---|---|---|---|
| | OK | Links to 2.1 My Online Albums | Primary Soft key, OK Button | ITEM | 1 |
| | Back | Previous screen | Back button | BACK | 1 |
| Up Arrow | — | | | | |
| Down Arrow | — | | | | |
| Left Arrow | — | | | | |
| Right Arrow | — | | | | |
| Comments | | | | | |

3.1.4.2 Mobile- Restore Album Info

| | |
|---|---|
| Default Selection | My Online Albums |

3.1.4.2 Mobile- Restore Album Info

| Actions | Label | Function | Pref. Location | Type | Priority |
|---|---|---|---|---|---|
| | OK | Links to 3.1.4.2.1 Restore Mobile Album | Primary Soft key, OK Button | ITEM | 1 |
| | Back | Previous screen | Back button | BACK | 1 |
| Up Arrow | — | | | | |
| Down Arrow | — | | | | |
| Left Arrow | — | | | | |
| Right Arrow | — | | | | |
| Comments | | | | | |

3.1.4.2.1 Restore Mobile Album

Default Selection

| Actions | Label | Function | Pref. Location | Type | Priority |
|---|---|---|---|---|---|
| | Pick | Toggles state of checkbox | Primary Soft key, OK Button | ITEM | 1 |
| | Save | Downloads all selected images to Mobile Album | Secondary Soft key | SCREEN | 1 |
| | Back | Previous screen | Back button | BACK | 1 |
| Up Arrow | Jumps to previous item in list. If top item is selected, does nothing. | | | | |
| Down Arrow | Jumps to next item in list. If last item is selected, does nothing. | | | | |
| Left Arrow | May toggle state of checkbox. | | | | |
| Right Arrow | May toggle state of checkbox. | | | | |
| Comments | This screen lists a close approximation of the items downloaded to a particular phone using a particular account. | | | | |

3.1.4.2.1 Restore Mobile Album

When the user has selected the photos he wishes to restore and presses "Save" all the images are downloaded to the mobile album. If the Mobile Album already has photos in it, restored photos are added at the bottom of the list.

3.2.1 Move

| Default Selection | Selected Photo | | | | |
|---|---|---|---|---|---|

| Actions | Label | Function | Pref. Location | Type | Priority |
|---|---|---|---|---|---|
| | Done | Drops photo in current location. Links to 3.2.1 with moved photo selected. | Primary Soft key, OK Button | OK | 1 |
| | Back | Links to previous page (before move command was selected) and cancels move. | Back button | BACK | 1 |
| Up Arrow | When (3) or (4) is selected, swaps with (1) or (2). When (1) or (2) is selected, moves up one row. | | | | |
| Down Arrow | When (1) or (2) is selected, swaps with (3) or (4). When (3) or (4) is selected, moves down one row. | | | | |
| Left Arrow | When (1) is selected, jumps to previous screen and swaps with (4) on that screen. When (2) is selected, swaps with (1). When (3) is selected, swaps with (2). When (4) is selected, swaps with (3). When first image is selected, jumps to last image. | | | | |
| Right Arrow | When (4) is selected, jumps to previous screen and swaps with (1) on that screen. When (3) is selected, swaps with (2). When (2) is selected, swaps with (3). When (3) is selected, swaps with (4). When final image is selected, jumps to first image. | | | | |
| Comments | Small arrow images overlaid on the image being moved. | | | | |

3.2.4 Delete

Default Selection —

| Actions | Label | Function | Pref. Location | Type | Priority |
|---|---|---|---|---|---|
| | Delete | Deletes photo and returns user to 3.1.1 or 3.1.2 (last used) with image in position of deleted image selected. | Primary Soft key | OK | 1 |
| | Cancel | Cancels deletion and links to previous screen | Secondary Soft key | BACK | 2 |

-continued

3.2.4 Delete

| | Back | Cancels deletion and links to previous screen | Back button | BACK | 1 |
|---|---|---|---|---|---|

| | | |
|---|---|---|
| Up Arrow | — | |
| Down Arrow | — | |
| Left Arrow | — | |
| Right Arrow | — | |
| Comments | | |

3.2.4 Delete All

| Default Selection | — |
|---|---|

| Actions | Label | Function | Pref. Location | Type | Priority |
|---|---|---|---|---|---|
| | Delete | Deletes all photos and returns user to 3.1.4 Mobile Album Empty. | Primary Soft key | OK | 1 |
| | Cancel | Cancels deletion and links to previous screen | Secondary Soft key | BACK | 2 |

-continued

3.2.4 Delete All

| | Back | Cancels deletion and links to previous screen | Back button | BACK | 1 |
|---|---|---|---|---|---|

| | |
|---|---|
| Up Arrow | — |
| Down Arrow | — |
| Left Arrow | — |
| Right Arrow | — |
| Comments | |

3.3 Mobile Slideshow

| Default Selection | — |
|---|---|

| Actions | Label | Function | Pref. Location | Type | Priority |
|---|---|---|---|---|---|
| | Stop | Ends slideshow and returns user to 3.1.1 or 3.1.2 (last used). | Primary Soft key | OK | 1 |
| | Pause | Pauses slideshow and switches first Action to "Play." Pressing again re-starts slideshow from the current image. | Menu | SCREEN | 1 |
| | Slow | Switches speed to Slow. | Menu | SCREEN | 2 |
| | Normal | Switches speed to Normal. | Menu | SCREEN | 3 |
| | Fast | Switches speed to Fast | Menu | SCREEN | 4 |

| | |
|---|---|
| Up Arrow | — |
| Down Arrow | — |
| Left Arrow | Jumps to previous image. Slideshow continues to play at same speed. |
| Right Arrow | Jumps to next image. Slideshow continues to play at same speed. |
| Comments | Image should be as large as possible on any particular screen. If possible, backlight should remain on until slideshow is stopped. Screen should not refresh while Actions menu is open. The screen has no header. |

Although the present invention has been described in accordance with the embodiments shown, variations to the embodiments would be apparent to those skilled in the art and those variations would be within the scope and spirit of the present invention. Accordingly, it is in tended that the specification and embodiments shown be considered exemplary only, with a true scope of the invention being indicated by the following claims and equivalents.

What is claimed is:

1. A method for backup and restore comprising:
   maintaining in a server a mirror database with a historical record backup for a client application uploaded from the server to a mobile device, the mirror database accumulating memory items in the historical record backup, wherein the items are associated with the client application and wherein the items mirror a historical record of the client application;
   receiving a plurality of recording requests associated with at least one action performed on the mobile device, while the mobile device performs the at least one action, wherein each recording request is received separately for each memory item accumulated in the mirror database in order to create the historical record backup in the server, responsive to saving the memory item in the mobile device;
   saving in the mirror database the memory item associated with each respective recording request, wherein for restoring the historical record, the historical record backup for the client application is accessible from the mobile device, wherein the client application enables navigation through pages associated with actions performed on the mobile device within the client application, and wherein the historical record backup includes a record of a sequence of the pages traversed while navigating through the pages of the client application, such that restoration of the historical record enables traversing through the pages of the client application in reverse sequence with a back button; and
   sending to the mobile device, by the server, the historical record backup, when the client application is re-uploaded from the server to the mobile device and a log in to the server is done, by automatically sending memory items in the historical record without need for the mobile device to initiate further interactions with the server.

2. The method of claim 1, wherein the mobile device is a wireless device with which the server communicates via a wireless carrier network and a network that includes the Internet.

3. The method as in claim 2, wherein the mobile device is a wireless phone and the identity of the mobile device is a phone number assigned to the wireless phone by the bearer of a wireless carrier network.

4. The method as in claim 1, wherein the client application is a client photo application and the memory items include any one or a combination of a mobile album, a selected photo data, a page navigation action and a back in sequence navigation.

5. The method as in claim 4, wherein the selected photo data includes photo image data and any combination of a photo name, a screen size and a path into a record in the mirror database for the selected photo data.

6. The method as in claim 5, wherein the mirror database record has a capacity suitable for a predetermined number of photos which if the predetermined number were to be exceeded by the saving of the selected photo data, the step of saving includes discarding from the mirror database record photo data for the oldest photo in order to make room for saving the selected photo data.

7. The method as in claim 1, wherein the memory items include at least a recordable action and a result of the recordable action.

8. The method as in claim 1, wherein the memory items reside in an archive file.

9. The method of claim 8, wherein the archive file is a Java archive file.

10. The method as in claim 1, wherein at least one of the recording request includes a request URL (Uniform Resource Locator) and a transaction crumb representing a recordable action.

11. The method as in claim 1, further comprising restoring the historical record from the historical record backup in the server once log in to the server is done.

12. The method as in claim 11, wherein the restoring step comprises the server sending to the mobile device a list of memory items from which any one or all of the memory items is selectable for recovery from the historical record backup.

13. The method as in claim 12, wherein the restoring step comprises the server sending to the mobile device a list of memory items from which any one or all of the memory items is selectable for recovery from the backup.

14. The method as in claim 11, wherein the client application is a client photo application, and wherein the restoring step comprises the server sending to the mobile device a mobile album list of photos from which any one or all of the photos is selectable for recovery from the backup.

15. The method as in claim 1, further comprising the server re-downloading the client application to the mobile device, or the server downloading the client application to another mobile device, the server pre-populating the downloaded or re-downloaded client application with the historical record from the backup.

16. A mobile device for restoring data from a client application over a network to a backup server, wherein the client application is operable by a user of the mobile device, comprising:
   a component for communicating information over the network;
   a processor configured to perform actions comprising:
      generating a plurality of communications by the client application, wherein the plurality of communications is associated with recordable actions performed within the client application, and wherein the plurality of communications is configured to cause a backup server to mark for backup at least one of the recordable actions;
      sending from the mobile device, each of the plurality of communications separately while performing at least one of the plurality of recordable actions, responsive to saving the memory item in the mobile device; and
      receiving from the backup server in response to a restore request, a backup historical record for restoring data associated with the recordable actions, wherein the data comprises a navigation history configured to enable the user to navigate within the navigation history, wherein the client application enables navigation through pages associated with actions performed on the mobile device within the client application, and wherein the historical record backup includes a record of a sequence of the pages traversed while navigating through the pages of the client application, such that restoration of the historical record enables traversing through the pages of the client application in reverse sequence with a back button, and wherein the restore request is a request for downloading another version of the client application onto the mobile device, and wherein receiving the backup historical record is performed automatically based the download of the other version of the client application without need for the mobile device to initiate further interactions with the backup server.

17. The mobile device of claim 16, wherein the navigation history comprises any two of a page for emailing photo data, a page for viewing a thumbnail of the photo data, or a page for selecting the photo data as a screen saver for the mobile device.

18. The mobile device of claim 16, wherein the plurality of communications comprises a request to add photo data to an online photo album for the user, and wherein the photo data is captured from the mobile device.

19. The mobile device of claim 16, wherein sending, from the mobile device, each of the plurality of communications separately comprises sending each of the plurality of communications in a separate Open System Interconnection (OSI) application layer request.

20. A system for synchronizing multimedia data over a network, comprising:
 a mobile device configured to perform actions comprising:
  accumulating a historical record of memory items associated with a client application operating on the mobile device and associated with a user of the mobile device;
  sending from the mobile device to a backup device, a separate recording request for each memory item in the historical record, while performing at least one navigation action within the client application, responsive to saving the memory item in the mobile device, wherein the client application enables navigation through pages associated with actions performed on the mobile device within the client application, and wherein the historical record includes a record of a sequence of the pages traversed while navigating through the pages of the client application, such that restoration of the historical record enables traversing through the pages of the client application in reverse sequence with a back button;
  sending to the backup device, a restore request; and
 the backup server in communication with the mobile device configured to perform actions comprising:
  sending from the backup device in response to the restore request, a backup for restoring a plurality of the memory items associated with the separate recording requests, wherein the restore request is a request for a download of another client application configured to use the memory items, and wherein the backup of the memory items occurs automatically based on recognition of the download of the other client application without a need for the mobile device to initiate further interactions with the backup server.

21. The system of claim 20, wherein the backup and the memory items comprise a sequence of page navigations and photo data, wherein the backup enables the user to navigate to a page within the sequence of page navigations, and wherein the page is configured to manage the photo data on the mobile device.

22. The system of claim 20, wherein the separate recording request comprises a request URL (Uniform Resource Locator), wherein a header portion of the request URL includes a transaction crumb representing a recordable action, and wherein a body portion of the request URL comprises the separate memory item to be recorded.

23. The system of claim 20, further comprising another mobile device configured to receive the backup.

24. The system of claim 20, wherein the restore request comprises a log-in of the user to a server from the mobile device.

25. The system of claim 20, wherein sending, from the mobile device to the backup device the separate recording request comprises translating the recording request from one Open System Interconnection (OSI) application layer protocol to another OSI layer protocol.

26. The system of claim 20, wherein the backup is a slideshow of data accessed by at least one of the navigation actions on the mobile device.

27. A processor readable medium for synchronizing multimedia data over a network, comprising instructions executable by a processor to perform actions, wherein the actions comprise:
 generating a plurality of communications by a client application on a mobile device, wherein the plurality of communications is associated with at least one recordable action performed by the client application, and wherein the plurality of communications is configured to cause a backup server to mark for backup the at least one recordable action;
 sending from the mobile device, each of the plurality of communications separately while performing at the at least one recordable action, responsive to saving the memory item in the mobile device;
 deleting of the client application on the mobile device; and
 receiving from the backup server in response to a request to download the client application onto the mobile device, a backup historical record for restoring data associated with the at least one recordable action, wherein the data comprises the multimedia data, and a navigation history configured to enable navigating within the navigation history, and wherein the backup historical record is automatically received by the downloaded client application without need for the mobile device to initiate further action, and wherein the client application enables navigation through pages associated with actions performed on the mobile device within the client application, and wherein the historical record backup includes a record of a sequence of the pages traversed while navigating through the pages of the client application, such that restoration of the historical record enables traversing through the pages of the client application in reverse sequence with a back button.

28. The processor readable medium of claim 27, wherein the navigation history comprises at least one web page configured to play a video game on the mobile device.

29. The processor readable medium of claim 27, further comprising at least another backup historical record for restoring data associated with at least a portion of the at least one recordable actions.

* * * * *